United States Patent
Chourey et al.

(10) Patent No.: US 8,626,913 B1
(45) Date of Patent: *Jan. 7, 2014

(54) TEST DATA ANALYSIS ENGINE FOR STATE-BASED WEBSITE TOOLS

(71) Applicant: Limelight Networks, Inc., Tempe, AZ (US)

(72) Inventors: Deepesh Chourey, Dublin, CA (US); James Muehiner, Alamo, CA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,535

(22) Filed: Aug. 5, 2013

(51) Int. Cl.
*G06F 15/173* (2006.01)

(52) U.S. Cl.
USPC .......................... 709/224; 709/223; 709/206

(58) Field of Classification Search
USPC ......................................... 709/206, 223, 224
See application file for complete search history.

(56) References Cited

U.S. PATENT DOCUMENTS

| | | | |
|---|---|---|---|
| 6,269,275 B1 * | 7/2001 | Slade | 700/90 |
| 7,328,177 B1 * | 2/2008 | Lin-Hendel | 705/26.7 |
| 7,379,965 B2 * | 5/2008 | Sherwood et al. | 709/203 |
| 8,307,081 B1 * | 11/2012 | Chourey | 709/224 |
| 8,478,868 B2 * | 7/2013 | Chourey | 709/224 |
| 2003/0167195 A1 * | 9/2003 | Fernandes et al. | 705/8 |
| 2004/0225562 A1 * | 11/2004 | Turner | 705/14 |
| 2005/0022103 A1 * | 1/2005 | Yundt-Pacheco | 715/500 |
| 2009/0018896 A1 * | 1/2009 | McGreal | 705/10 |
| 2009/0164940 A1 * | 6/2009 | Wampler | 715/808 |
| 2013/0054303 A1 * | 2/2013 | Chourey | 705/7.29 |

* cited by examiner

*Primary Examiner* — Liangche A Wang
(74) *Attorney, Agent, or Firm* — Kilpatrick Townsend & Stockton LLP

(57) ABSTRACT

A method of analyzing website nurturing data while compensating for test visitor profiles may include tracking interactions between visitors and the website including test visitors, and computing a score for each of the visitors based on the interactions. The method may also include storing the score for each of the visitors in visitor profiles, where test visitor profiles correspond to the test visitors. The method may additionally include assigning a discrete profile state to each of the plurality of visitor profiles from a hierarchy of profile states based at least in part on the corresponding score, and storing a test indicator in each of the test visitor profiles. The method may further include computing reporting data based on the plurality of visitor profiles, where the one or more test visitor profiles are excluded at least in part from the reporting data.

20 Claims, 12 Drawing Sheets

| E-mail Address | Name | Lead Score | Last Visit | Level |
|---|---|---|---|---|
| ☑ jake@test.net | Jake Scott | 15 | 07/05/2013 – 10:17 AM | 1 |
| ☑ bobby@yahoo.com | Robert Zemeckis | 45 | 07/18/2013 – 01:58 PM | 2 |
| ☐ alex@yahoo.com | Alex Zivojinovic | 25 | 07/16/2013 – 04:53 PM | 4 |
| ☐ geddy@yahoo.com | Gary Weinrib | 15 | 08/04/2013 – 12:16 PM | 2 |
| ☐ neil@yahoo.com | Neil Peart | 80 | 08/04/2013 – 12:17 PM | 3 |
| ☐ lerxst@cygnus.net | Al Lifeson | 55 | 07/04/2013 – 11:10 AM | 6 |
| ☐ dirk@cygnus.net | Geddy Lee | 36 | 08/01/2013 – 08:46 AM | 5 |

FIG. 8

TEST DATA ANALYSIS ENGINE FOR STATE-BASED WEBSITE TOOLS

BACKGROUND

Websites are often a part of an integral plan in advertising business solutions and engaging visitors as customers or potential customers. Nurturing those visitors to the website has traditionally taken human expertise, skill, and effort that have been impractical in converting a large number of visitors into customers. While an experienced sales person may be able to quickly evaluate a contact and determine whether or not he/she is a prospective customer, the sheer volume of visitors to a website and the impersonal nature of web interactions make large-scale human involvement infeasible and impractical. Business-to-business websites traditionally have not reached their marketing potential in yielding qualified leads.

Historically, email marketing and sales campaigns have driven visitors to a website to discover information about a company—much like an online brochure. With the advent of sophisticated marketing automation tools, marketing campaigns have focused on creating conversions or registrations to capture visitor data. However, real personalization of the website visitor's experience has not been possible due to the fact that the marketing tools could not instruct a static website what particular content to present to any given visitor. Hence, improvements in the art are needed.

BRIEF SUMMARY

In some embodiments, a system for analyzing website nurturing data while compensating for test visitor profiles may be presented. The system may include a nurturing engine that receives interactions between a plurality of visitors and a website. The plurality of visitors may include one or more test visitors. The nurturing engine may score each of the plurality of visitors based on the interactions between each of the plurality of visitors and the website. The system may include a profile database that stores a plurality of visitor profiles that correspond to the plurality of visitors. Each of the plurality of visitor profiles may be assigned a discrete profile state from a hierarchy of profile states. The plurality of visitor profiles may include one or more test visitor profiles corresponding to the one or more test visitors. Each of the one or more test visitor profiles may include a test indicator. The system may additionally include a visitor analytics engine that is configured to receive the plurality of visitor profiles and generate reporting data based on the plurality of visitor profiles. The one or more test visitor profiles may be excluded at least in part from the reporting data.

In some embodiments, one or more of following features may also be implemented. The reporting data may describe a progression of the plurality of visitor profiles through the hierarchy of profile states. The one or more test visitors may include inputs provided from a customer employee to the website to test a progression through the hierarchy of profile states. The nurturing engine may be configured to customize a website feature comprising one or more selections from the group consisting of: website content, website look-and-feel, and website organization. The system may further include a visitor identification module that is configured to automatically identify the one or more test visitor profiles from among the plurality of visitor profiles; and store the test visitor indicator in each of the one or more test visitor profiles based on the automatic identification. The system may also include a visitor identification module that is configured to receive one or more user inputs that identify the one or more test visitor profiles from among the plurality of visitor profiles; and store the test visitor indicator in each of the one or more test visitor profiles based on the one or more user inputs. The reporting data may include first reporting data, and the visitor analytics engine may be further configured to generate second reporting data based on the plurality of visitor profiles, where the one or more test visitor profiles may be used to generate the reporting data. The visitor analytics engine may be further configured to compare the first reporting data to the second reporting data to generate a score indicating an effectiveness of the nurturing engine. Parameters of the nurturing engine may be altered based on the score. The nurturing engine may provide access to gated content for a device associated with a first visitor profile in the plurality of profiles based on the discrete profile state assigned to the first visitor profile from the hierarchy of profile states.

In some embodiments, a method of analyzing website nurturing data while compensating for test visitor profiles may be presented. The method may include tracking interactions between a plurality of visitors and a website, where the plurality of visitors may include one or more test visitors. The method may also include computing a score for each of the plurality of visitors based on the interactions between each of the plurality of visitors and the website, and storing the score for each of the plurality of visitors in a plurality of visitor profiles. The plurality of visitor profiles may include one or more test visitor profiles corresponding to the one or more test visitors. The method may additionally include assigning a discrete profile state to each of the plurality of visitor profiles from a hierarchy of profile states based at least in part on the corresponding score. The method may further include storing a test indicator in each of the one or more test visitor profiles; and computing reporting data based on the plurality of visitor profiles. The one or more test visitor profiles may be excluded at least in part from the reporting data.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 8 illustrates an interface for identifying test visitors, according to some embodiments.

DETAILED DESCRIPTION

Figure 1:
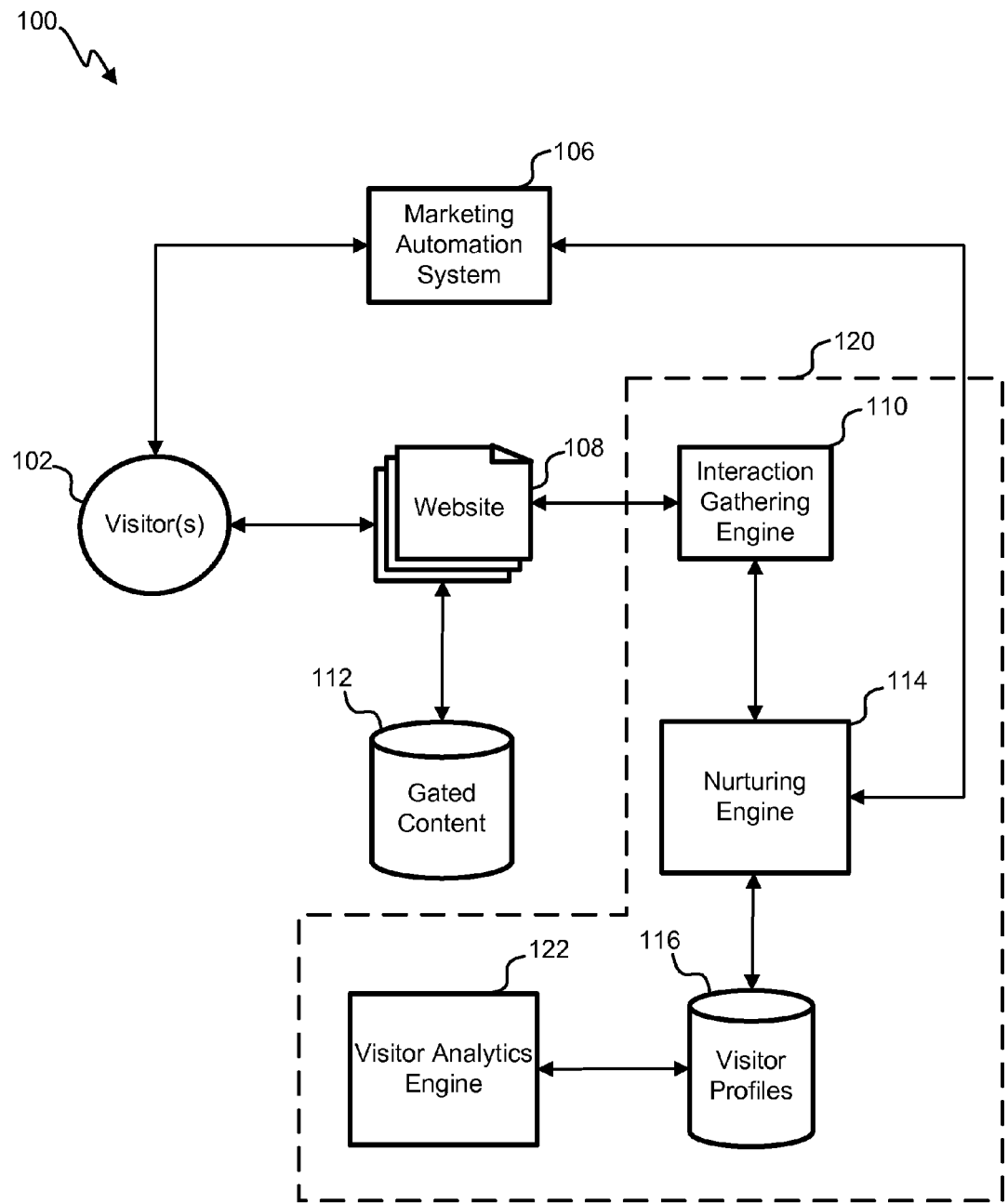
FIG. 1 illustrates a block diagram of an embodiment of a Web Content Management System.

The ensuing description provides exemplary embodiments only, and is not intended to limit the scope, applicability or configuration of the disclosure. Rather, the ensuing description of the exemplary embodiments will provide those skilled in the art with an enabling description for implementing an exemplary embodiment. It is understood that various changes may be made in the function and arrangement of elements without departing from the spirit and scope as set forth in the claims.

According to some embodiments, a progressive profiling system with discrete profile states can be applied to both individual visitors to a website as well as groups of visitors to a website. In some embodiments, interactions between the website and an individual visitor can be detected and analyzed during a communication session. A characteristic associated with the communication session, such as a business organization, an IP address, or a geographic location, may be detected. This characteristic can then be matched with a group profile. The group profile can be associated with multiple different visitors and/or communication sessions that are all associated with the same characteristic. For example, users associated with the same business can all be associated with the same group profile. The group profile can progress through discrete states in the same way that individual profiles can progress through discrete states. Each individual visitor associated with the group profile can be allowed to access additional content based on the entire group's interactions with the website.

Described herein are embodiments for operating a Web Content Management System (WCMS) to present a website to visitors in a way that generates increased interaction between users and the website over time until the visitors become qualified sales leads. The WCMS may include a nurturing engine, otherwise referred to as a Web Marketing Acceleration (WMA) engine that scores and tracks visitor interactions on the website. The WMA may be configured to solicit additional information from the user, store the interactions and information in a user profile, generate a lead score, and tailor the content and/or organization of the website based on the visitor profile. A discrete state machine may be used to track visitor profile levels, and as lead scores increase due to interactions, users may ascend through a hierarchy of discrete profile states by providing additional information (e.g., an e-mail address, a business address, professional information, etc.).

Customers of the WMA can use the system to create marketing strategies that are designed to guide visitors to the website through a user experience that increases their interest in the customer's products and/or services. However, testing these marketing strategies is a difficult and nuanced operation that is difficult to achieve using traditional test vectors or simulated data. Many customers want to perform dry runs on their marketing strategies without changing the way the WMA operates. By way of example, many customers may prefer to have their own web test engineers or employees search through their website and provide a subjective assessment of their experience. Thus, the WMA and the website treat visitors that are merely testing the marketing strategy of the website the same as visitors who are actual sales prospects for the customer.

By testing the many possible pathways and progressions through the WMA using actually test visitor inputs allows the customer to evaluate their marketing strategies based on human observations and real-time feedback. This method also allows the WMA to be tested without altering its design, including special test modes, additional coding, and special case processing. In other words, test visitors see the exact same user experience on their screen from the website as is presented to real visitors.

As used herein, the term customer may refer to a customer of the WMA, in many cases, a customer may use the WMA to establish their website and track visitors in order to establish qualified sales leads. In some embodiments, the WMA may be operated by the same entity hosting a content delivery network (CDN). In this arrangement, the CDN can host the content and code for the website, providing efficient and fast downloads for the user, while the WMA can operate on the CDN as well to track and score customer interactions. This combination of a WMA and the CDN can allow a customer control both aspects of the user experience through a single point of contact; the CDN can adjust how content is delivered, while the WMA can customize how the content is presented to a user.

As used herein, the term visitor may refer to any visitor of the customer's website that is managed by the WMA. For example, a visitor may access the website from a laptop computer or smart phone in order to download content. A test visitor is a subset of the visitor class. Test visitors are still considered visitors, however, it may be said that their intent is different. A test visitor may be characterized as a visitor who is interacting with the website in order to test how content is presented based on their interactions. A test visitor may also characterize an employee or test engineer of the customer who is testing the website. Visitors may occasionally be referred to as regular visitors in order to distinguish them from test visitors.

Because test visitors are treated the same as regular visitors by the WMA, it can be assumed that the user experience as seen by a test visitor is a valid representation of the user experience as will be presented to a regular visitor. However, problems arise when the customer wants to analyze data recorded by the WMA. Because testing is an ongoing process, and thus test visitors may constantly be interacting with the website, the test visitor data will be mixed in with the regular visitor data. The WMA may include a visitor analytics engine that can access the visitor profiles stored by the WMA and generate reporting data that may be useful for a customer in analyzing the effectiveness of their website marketing scheme.

For example, the visitor analytics engine may provide weekly reports to a customer describing the number of visitors progressing to a certain one of the discrete profile states in the hierarchy. Such a report would necessarily include regular visitors who had sufficiently progressed through the hierarchy, as well as test visitors. Thus the advantage of using test visitors to navigate through the website in order to provide a realistic evaluation of the website marketing progression inevitably distorts any reporting data that were computed after test visitors were introduced to the system. Simply deleting test visitors is inefficient because certain test visitors need to interact with the website over a prolonged period of time in a repeated fashion. In short, test visitors needed to stay in the system to mimic real visitors without corrupting reporting for the customer. Additionally, the WMA profile progression system includes a state-based hierarchy. Therefore, instead of just submitting a set of dummy inputs, a test visitor may be required to navigate the website, view or download content, and provide verifiable information in order to progress through the state hierarchy. This may be a time-consuming process that cannot be efficiently repeated every time test visitors are removed from the system.

The embodiments described herein provide methods and systems for identifying a test visitor at various points during the test visitor interaction with the website. These embodiments may store an indication in a visitor profile associated with the test visitor. The WMA, or nurturing engine, can disregard any test visitor indicator and continue to treat test visitors the same as regular visitors. The WCMS may also include a visitor analytics engine that is configured to generate reporting data based on stored visitor profiles. The visitor analytics engine may be configured to operate in a number of different modes. For example, the visitor analytics engine can generate reporting data that includes only test visitors, reporting data that includes only regular visitors, reporting data that includes both test visitors and regular visitors, and so forth. The visitor analytics engine may also generate a report that can be sent to third-party advertisers distinguishing ad views by regular visitors from ad views by test visitors. In the case of internal ad engines, this reporting data can be used to adjust revenues paid to advertisers and views recorded by customers.

Web Content Management System

As used herein, the term "website" refers to a single web domain. The website may be comprised of multiple individual pages; however, each page in the website may be associated with a single business brand or organization. For example, www.clickability.com could be considered a website associated with the Clickability™ brand and product. Each webpage in the www.clickability.com domain could be considered a part of the www.clickability.com website, as used herein.

A WCMS may include computer programs that allow for the publishing, editing, and modifying of data content on a website, as well as maintenance from a centralized platform. A WCMS can typically be used to present information on websites. Data content managed by a WCMS may include items such as documents, movies, pictures, text, scientific data, phone numbers, database information, animations, white papers, product descriptions, navigational structures, contact information, data entry forms, code, JavaScript, interactive chat pages, and/or the like. Serving as a central repository, a WCMS can be used to uniformly raise the version level when new updates are added to an already existing item of data content. The WCMS may be particularly beneficial when used to catalog and index content, select or assemble content at runtime, or deliver content to specific visitors in a requested way. A WCMS may allow client control over files, documents, and other content based on a particular visitor In some embodiments described herein, the WCMS may be integrated with a lead management system. Generally, lead management is a term used to describe general business practices and methodologies designed to generate new potential business clientele. In other words, lead management facilitates a business's connection between it outgoing customer advertising and the responses to that advertising. Lead manager may include business-to-business strategies, as well as direct-to-consumer strategies. Will the lead management system may be used to manage business inquiries, or leads, in order to guide potential customers through an organization's public information. Embodiments described herein may implement a lead management system in a WCMS. In these embodiments, the lead management system is used to track, guide, and customize a potential customer's interaction with data content of a business organization's website. At a certain level of interaction, the potential customer may be determined to be a lead that is ready for an increased level of sales and marketing exposure and/or contact.

FIG. 1 illustrates a block diagram 100 of an embodiment of a lead management system 120. Visitors 102 interact with a website 108 monitored by an interaction gathering engine 110. A marketing automation system 106 may drive prospects to the website 150. Although a marketing automation system 106 is shown separately, the marketing automation system 106 could be integrated with the lead management system in other embodiments. The lead management system 120 choreographs the website's interactions with the visitor 102 to lead to a sale or deepen the relationship with the visitor 102.

The lead management system 120 may include an interaction gathering engine 110 is configured to identify visitors 102 and monitor their interactions with the website 108. The lead management system 120 may also include a nurturing engine 114 that is configured to score visitor interactions, maintain visitor profiles, advanced visitors through the profile state hierarchy, and provide parameters that can be used to control the look and feel, organization, or content of the website 108 based on each individual visitor. The nurturing engine 114 may also identify interests for visitors, associate visitors into group profiles, automatically identify business is associated with the visitor using an IP address, and receive external login information from sources such as social media sites, e-mail, and proprietary login systems.

The lead management system 120 may also include a profile database 116 configured to store visitor profiles. Visitor profiles may include a history of their interactions with the website 108 including a listing of content viewed, time spent on particular webpages, the order in which content and webpages were viewed, time between visits, and so forth. Visitor profiles may also store information provided by visitors, such contact information, business information, specialties, affiliations, interests, products, and so forth. Visitor profiles may also store analysis performed by the nurturing engine 114, such as a discrete profile state identifying a buying level of the visitor 102, associations automatically made with other visitors, groups to its vision may be assigned, and so forth.

The lead management system 120 may also include a visitor analytics engine 122 configured to access the visitor profiles in the profile database 116 and provide reporting data accessible by the customer providing the website 108. The visitor analytics engine 122 may accept various input parameters to generate reporting data over a certain time intervals, and across cross-sections of the visitor profiles.

The lead management system 120 could be hosted on the same computer system, hosting service or CDN as the website 108, and the lead management system 120 and the CDN may be operated by the same entity, such as Limelight Networks®. Some information may be provided by external sources, such as a marketing automation system or ad module configured to retrieve advertisements from an external ad server. The website 108 may provide some information to all visitors 102, but other gated content 112 may be provided to visitors 102 who have reached a particular qualified profile state in the hierarchy of profile states.

It will also be understood that arrangement of the WCMS 100 and the lead management system as depicted in FIG. 1 is merely illustrative. Many other arrangements of software and hardware functionality are possible. For example, software modules that are depicted as separate in these figures may be combined into the same software module. Likewise, software modules may be divided an implemented remotely from one another in different hardware systems. Additionally, the various roles assigned to web developers, marketers, users, and content designers may be reassigned according the individual needs and expertise of an implementing business.

Nurturing Engine

In order to assess the interactions of a visitor with a website, ascertain interests, and create a qualified lead, the website may need to identify individual visitors, then track and store information such that the visitor's overall quality as a lead can be assessed. When a visitor first accesses the website, the visitor may be classified as an anonymous visitor. The interactions with the website by an anonymous visitor may be a singular visit, or they may be comprised of multiple visits, where each visit may have one or multiple page requests within the website. The end of a visit may be governed by a period of inactivity, and a visit may be deemed complete after the period of inactivity surpasses an established visit-timeout value. For example, a period of inactivity of 30 minutes may signal the end of a visit. In some embodiments, if a visitor closes their browser and returns within the timeout period, the visitor may be credited with a new visit rather than a continuation of the previous visit. Some embodiments may also use an aging cutoff to detect stale visitors. For example, if the time between visits to the website exceeds the aging cutoff, such as 120 days, and the visitor has not submitted information for a user profile, then the website may start a new user profile for the visitor. Alternatively, if the visitor has established a user profile, then an expired account may reset certain information in the user profile that is likely to be stale at that point.

To track a visitor, a lead management system in a WCMS may have logic added to at least some of the published pages within the website specifically for this purpose. For example, the website could check for a "vmSessionId" cookie, which may include a string token that may uniquely identify each visitor. If such a cookie exists, the website may load any information that has been saved by the website for that particular visitor. If the vmSessionId cookie does not exist, the website may create a new anonymous visitor profile and create a vmSessionId cookie in the browser of the visitor. Additionally, if the visitor does not have a vmSessionId cookie, the website may present the visitor with the opportunity to provide identifying information, such as a user name and/or password, to identify the visitor for this web session and for future web sessions. In this case, the website may recreate a vmSessionId cookie and load information about the visitor from a stored user profile. This may allow the website to recognize the visitor on a subsequent visit without the visitor being required to provide any identifying information.

After an anonymous user profile is established for the visitor, any information provided by the visitor and any information that may be ascertained by analyzing the interactions of the visitor with the website may be stored in the user profile. As more information is collected from a visitor, the anonymous user profile may be populated such that the visitor is no longer considered anonymous, but instead becomes an engaged prospective sales lead. Any and all aspects of the website interaction may be stored in the user profile, such as the interests, contact information, and/or business needs of the visitor. The various uses and function of the user profile are discussed in greater detail later in this disclosure.

While much of the information stored in a user profile may be provided by the visitor or ascertained by analyzing the visitor's website interactions, it is also possible to import information about a visitor based on an IP address. In one embodiment, the website may be able to detect the IP address of the visitor, and then an existing database may be queried using the IP address to gather additional information about the visitor. For example, Demandbase® is a third party service that can provide information about a business based on an IP address. Another such product is Geo Location from MaxMind®, which provides geographic location information based on the IP address of the visitor. The information acquired from an IP mapping service may be imported into the user profile of the visitor. In the case where visitor is new or anonymous and the user profile is empty, the information from the IP mapping may be used to initially populate a user profile with information. Using services such as these also relieves the visitor of the need to provide this information themselves, which may in turn ease the process of creating a qualified sales lead, and alleviate visitor frustration associated with filling out web forms.

In addition to individual user profiles, accounts may also be established for businesses. A business account may be established explicitly by the business by registering as such with the website. Alternatively, if a visitor provides information identifying the business of the visitor, a separate business account may be created. In some embodiments, IP mapping as described above may be used to identify a business and to identify individual visitors associated with that business. For example, a new visitor may access the website, and the website may recognize the IP address of the visitor as belonging to, for example, ACME corp. In this case, a business account for ACME corp. may be created and populated with information about the business through methods similar to those described above. Additionally, a user profile could be created for the visitor, and the user profile could be linked to the business account, and/or information from the business account could be imported and stored in the user profile. Business accounts may be useful for a website to ascertain, depending upon the particular embodiment.

In addition to IP mapping, the external data sources described above for user logins may also provide profile information to be stored locally on the Web server. When first accessing a website associated with a WCMS, a user may be prompted to create an account or login to an existing account. If a user already has an existing account with the website, the user can provide login credentials that were previously agreed upon between the user device and the website. However, a number of available login options may also be made available to a user. As discussed above, these may include options such as Facebook®, Disqus®, Google®, Twitter®, Yahoo®, OpenID®, and/or the like. In some embodiments, the services may be presented to a user for their convenience. In various embodiments, using these services may be more appealing to a user, may decrease the number of usernames and passwords the user is required to remember, make the user feel more secure using the website, and/or may overall encourage the user to provide login information.

Lead scoring is a method for a marketer to quantitatively assess a sales prospect's interest in the marketer's products. The marketer may define parameters for creating, incrementing, and decrementing lead scores based on various factors. Explicit factors may be used, such as demographic information, expressions of the interests of a visitor in the marketer's products, company size, industry segment, job title, and/or geographic location. Implicit factors may be derived by monitoring a sales prospect's behavior. Examples of implicit factors may include website visits, e-mail openings, clicks on advertisements, and/or accessing information. Any of these explicit or implicit factors may be tracked by the marketer and may contribute, either positively or negatively, to a lead score. Generally, a higher lead score may indicate that the prospect is likely to respond favorably to further interaction with the marketer's attempts to solicit a sale, and that eventually the prospective customer should be routed from the marketing department to the sales department.

In the context of a website operated by a WCMS, the concept of lead scoring may be tailored to track the actions of a visitor to the website. Explicit factors contributing to lead score of the visitor may include filling out online forms, requesting information, participating in chats, and/or registering a user profile or account with the website. Implicit scores may be derived from monitoring various forms of the online behavior of the visitor, such as number, frequency, and recency of website visits, whitepaper downloads, website navigation, access of specific content, and/or searching for products or solutions. Each of these factors may have a numerical score associated with the factor, and that score may be added to, or subtracted from, the overall lead score of the visitor. Scoring may be dynamic, such that the score associated with a current action may be increased or decreased based on previous actions. For example, each visit to a webpage that is related to the same topic may increase the score associated with each successive viewing of each new webpage. On the other hand, multiple views of the same webpage may decrease the score associated with each successive viewing of the same webpage, depending upon the particular embodiment.

As the lead score for a particular visitor increases during their association with the website, the WCMS may take actions to increase the website's interactivity with the visitor. Generally, certain threshold values may be established to act as triggers. As the lead score of the visitor crosses a threshold value, the website may present the visitor with more interactive content that may be calculated to increase the assumed interests of the visitor in the offerings of the website, or to solicit additional information from the visitor. The lead score of the visitor may cross the threshold value in both the positive and negative direction. Crossing a threshold in the positive direction may indicate that the visitor is expressing increased interest in the website, while crossing a threshold in the negative direction may indicate that the visitor is losing interest in the website. In either case, the website may need to show content that is more targeted towards the interests of the visitor, or the website may need to show content that is more varied in order to find something that the visitor is more interested in viewing. In some embodiments, a threshold score may be determined, which when crossed, may designate the visitor as a qualified lead, i.e., a lead that is ready for more aggressive and/or direct contact with a sales department associated with the website. When the lead score of the visitor indicates a qualified lead, the WCMS may be programmed to alert the sales department, to present purchasing opportunities to the visitor, or to take any other action that may be calculated to follow up the expressed interest of the visitor with a sales opportunity.

Lead scoring may take various forms, and may depend on a number of different factors associated with the website. In some embodiments, a score may be associated with each detectable action taken by a visitor while interacting with the website. For example, a value of "25" may be added to the lead score of a visitor every time the visitor downloads a document from the website. In this case, the action of downloading the document could be statically programmed into the WCMS such that every instance of downloading the document may increase the lead score of the visitor by 25 points. On the other hand, it may also be beneficial to dynamically determine the appropriate score at the time of the action based on the history of actions by the visitor and how those actions correlate with the interests of the visitor. For example, the website may be added to the lead score of the visitor when the visitor downloads three or more documents, in addition to tracking and scoring each of the individual downloads.

In one embodiment, visitor interactions with the website can generally be placed in three categories for scoring: (1) content and media items, (2) actions, and (3) information submissions. Content and media items may include viewing videos, product specifications, sample code, and/or training materials, downloading trial software, white papers, audio or video presentations, or using online resources, such as web forms, online calculators, spreadsheets and/or the like. The action category may include searches, number of visits, frequency of visits, navigation between pages, accessing content through specific web portals, adding items to a resource portfolio, creating a user profile, saving research trials and/or searches in a user profile, and/or the like. Information submissions may include all instances where the visitor provides personal or business information to the website, for example, filling out a web form, saving information in a user profile, revealing an association with a business, and/or expressing interest in business solutions associated with the website. These categories are illustrative, and not meant to be limiting. It will be understood that these categories may be changed to meet needs and content of each individual organization and website.

In some embodiments, information submissions may be explicitly linked to voluntary submissions by a user. These may indicate a level of user interest. In other embodiments, information submissions may also include information provided by an external data source, such as external data sources used to log in a user as described above. In some cases, the information requested from a user by the website and the information provided by an external data source login may be very similar. For example, a first request for information by the website may focus on personal information used to identify a visitor. Similarly, an external data source may provide personal information, including names, addresses, e-mails, phone numbers, businesses, and/or the like. When the information overlap sufficiently, the information provided by an external data source may be treated similarly to information provided explicitly by a visitor.

When a WCMS is used to present a website's content, the score for each type of interaction may be determined within the WCMS. In one embodiment, a section of the WCMS interface may be set aside for setting the threshold lead scores and the corresponding actions that may be taken in response to the crossing threshold scores. For example, it may be possible in the WCMS to specify a threshold for a "qualified lead" score. Such a threshold may be set universally and applied to each visitor, or the threshold may be set differently for different classes of visitors. For instance, the threshold may be set to "100" for visitors who are unassociated with a business account, while the threshold may be set to "75" for visitors who are associated with a business account. Alternatively or additionally, a threshold may be set higher/lower for a visitor having information provided by an external data source, such as an external logins, and so forth.

In addition to setting the threshold levels, a WCMS may include an interface for setting the scoring values for each instance of visitor interaction with the website. For example, a WCMS may include a means for selecting specific content, media, and/or actions, and may assign a lead score value to each type. In one embodiment, a lead score value is set for each content instance of a certain type. For example, when a visitor watches any demonstration video, a score of "10" may be added to the visitor's lead score. Content may be scored collectively based on content type (video, audio, and/or documents, etc.), by content category (products, research, and/or marketing, etc.), or by interest of the visitor (solutions for managers, data sheets for engineers, sales solutions, etc.). If no score is set for a particular type of interaction, the WCMS may set a default scoring level to apply to each unassigned interaction.

Additionally or alternatively, each instance of a website interaction may be scored individually, as described above. One embodiment may allow for assigning specific scores to each instance, such that downloading a first white paper would have a score of "10", while downloading a second white paper could have a score of "15". Assigning values to specific content may be done by a website developer and available to the WCMS through exposed tags in the content code that may be accessible to the WCMS, or the scores may be entered into the WCMS by marketers when the content is published to the website, depending on the particular embodiment.

According to one embodiment, lead scores may also be associated with each instance where a visitor provides information to the website. During the course of navigating the website, various types of information that may be requested from a visitor, such as e-mail, job function, size of company, and/or the like. In one embodiment, filling out a web form may be associated with a predetermined lead score. Optionally, each field within the web form may be individually associated with a lead score that can be added to the visitor's lead score when it is properly populated with data from the visitor. In one embodiment, an interface within the WCMS may be provided by which particular lead scores can be associated with each web field. For example, if a visitor fills out a web form and provides an e-mail address, then the associated lead score of "10" could be added to the lead score of the visitor.

Lead scores may also be associated with information provided by external data sources used during a login procedure. In one embodiment, information provided by the external data source may be scored in a manner similar to situations where the same information would be entered explicitly by the user in a web form. In another embodiment, a lead scored may be associated with each different external data source selected by a user. For example, a user may select two different external data sources, each providing different information to the website. A lead score of 10, for example, may be associated with each external data source identified and linked by a user. Furthermore, when a user links an external data source to an existing internal profile, additional points may be added to a lead score. Linking an account in this manner may indicate that the user is willing to share information stored by the external data source.

When determining the lead score values to associate with each type of visitor interaction, it may be advantageous in some embodiments, depending on the particular implementation, to develop a scoring strategy to avoid overlapping lead score contributions and accurately gauge visitor interest. For example, some embodiments can divide lead score points between viewing a page with a download link, clicking on the link, and watching media associated with the link. Additionally, there may be a variety of ways to establish, track, and divide lead scores for the website's content and actions. It will be understood that the lead scoring methods described above are merely illustrative.

When a visitor is associated with a visitor profile, the website may be programmed to collect personal, business and other information from the visitor. In a way to similar to how a lead score may indicate the value of a visitor based on their activity on the website, a user profile may be incrementally filled with information and indicate a the willingness of the visitor to receive further sales interactions. A progressive profile may be defined as a visitor profile designed to have a number of different levels, or states, corresponding to increasing amounts of information provided by the visitor. Progressive profiling may enable marketers to capture an increasing amount of information about individual visitors over time, incrementally enriching the user profile. Generally, a visitor will gradually complete their profile; however, it is also possible for a visitor to supply a large amount of information in a single session and jump between multiple profile levels or states. In one embodiment, the each profile level can be associated with a certain type or number of information fields that must be completed by the visitor before the profile is allowed to progress to the next level. In another embodiment, each profile level can be associated with a particular piece of information that needs to be received from a visitor in order to progress to a subsequent level or state.

Figure 3:
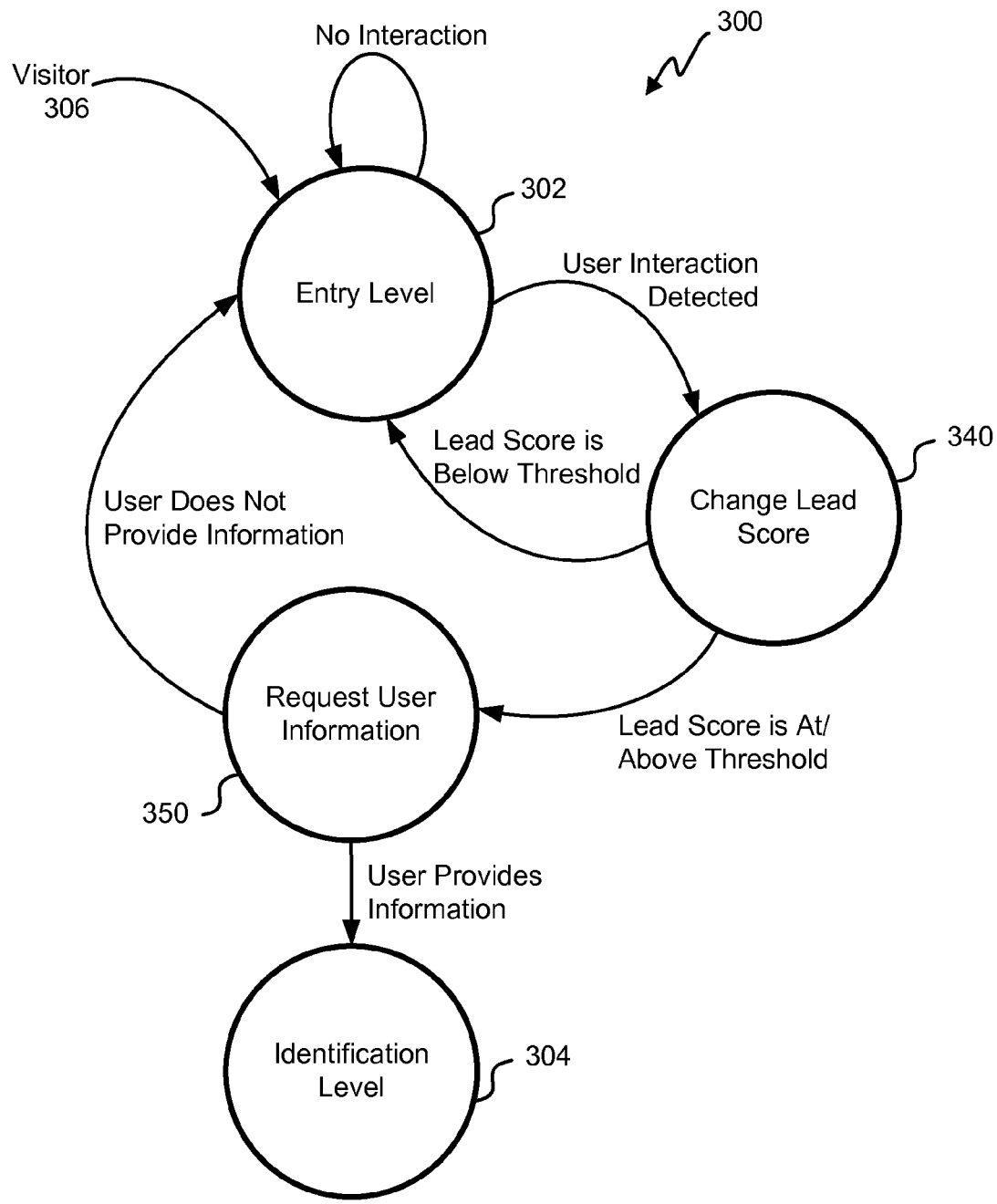
FIG. 3 illustrates a state diagram for moving between discrete states, according to some embodiments.

FIG. 3 illustrates a state diagram 200 of a visitor progressing through discrete states, according to some embodiments. The progression between the various levels in the progressive profiling scheme may depend, at least in part, on the amount of information provided by a visitor 206. When a visitor first encounters the website, the visitor 206 may be associated with an anonymous, or entry level profile 202. The entry level profile 202 may be assigned to new visitors, anonymous visitors, or to visitors for whom there is very little known information. At a certain point, the visitor 206 may be asked, for example, for identifying contact information. If the visitor 206 provides the identifying contact information, the profile can progress to the next level, which may be termed the "Identification Level" 204. Similarly, if the visitor 206 continues to navigate through the website and/or access content, the website may be programmed to present the visitor 206 with the opportunity to provide a second level of information.

According to one embodiment, the second level of information may relate to business needs. If the visitor 206 provides the business needs information, the profile may progress to the next level, which may be an "Identify Pain Points" level 208. In one embodiment, this level may be reached when the visitor 206 provides information about specific products and/or services they are interested in. These specific products and/or services may relate to specific needs of the visitor 206, which may be termed "pain points." Finally, at some point the visitor 206 may be given the opportunity to provide the website with purchasing information. If such information is provided, the profile may progress to a final level termed the "Buying Horizon" level 212.

Figure 2:
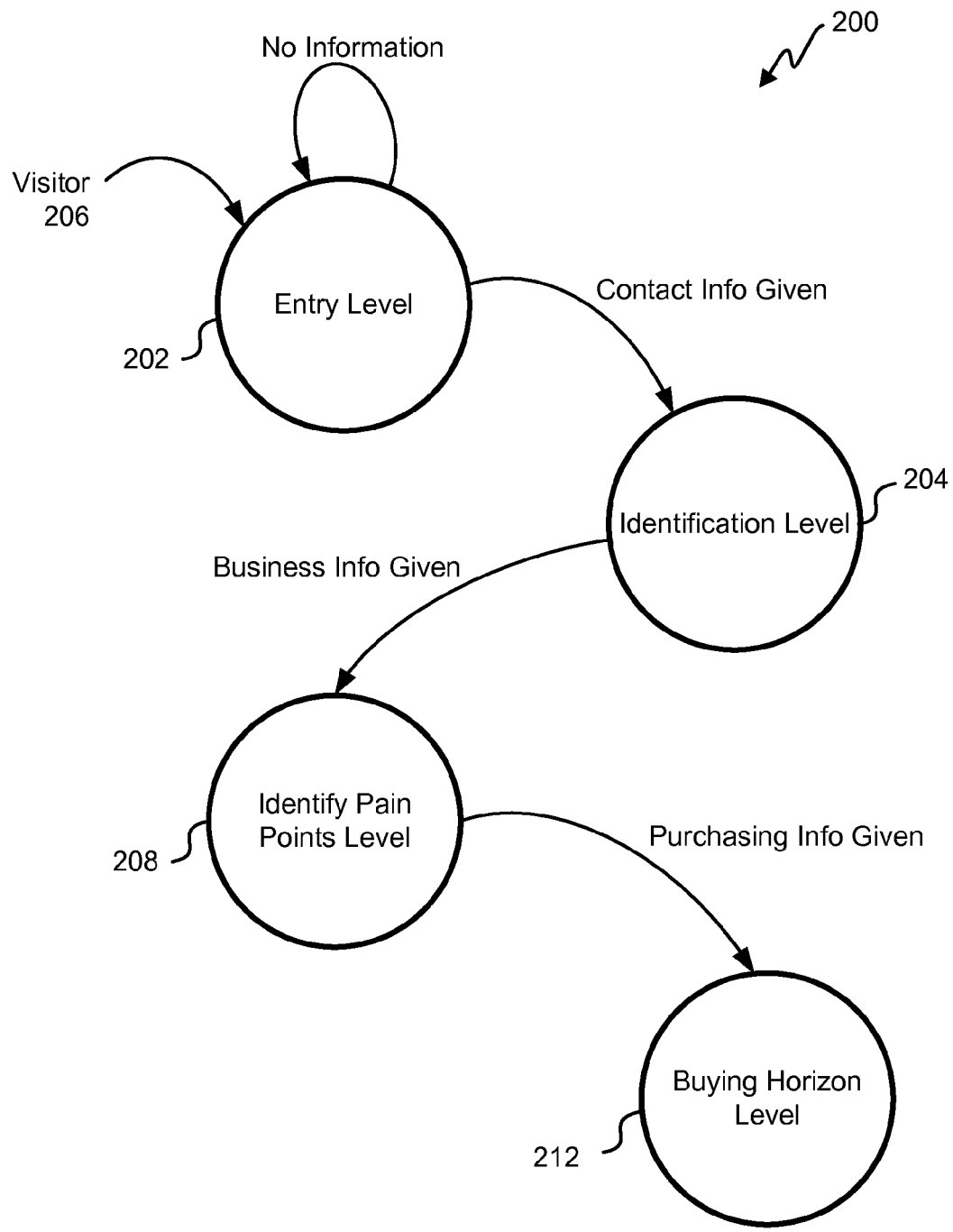
FIG. 2 illustrates a state diagram of a visitor progressing through discrete states, according to some embodiments.

The example shown in FIG. 2 is merely illustrative, and is not meant to be limiting. It will be understood that many different profile progressions may be used, and that the information required from each level may be tailored to meet the unique needs of a business. For example, a company may require extensive contact information, including first name, last name, username, e-mail, address, city, state, zip, country, company, phone number, fax number, mobile number, website, birth date, ideal contact times, and/or the like. For business information, a website may be programmed to require a business name, industry, size of company, listings of various business interests, revenues, and/or problems that the visitor 206 is attempting to solve. For purchasing information, the website may be programmed to require a budget, purchasing timeframe, role in the purchasing process, purchasing contact, and/or a listing of more specific business interests. These types and categories of information may be enlarged or reduced, and may be subdivided according to the marketing plan of the website owner/operator. In one embodiment, the desired profile fields may first be chosen, and then they may be grouped by type and divided into various progressive profile levels that are arranged according to perceived willingness of the visitor 206 to divulge the information.

Some embodiments present the same profile questions to every visitor associated with a given profile level. However, some embodiments may allow the progressive profile questions to be tailored to the type of visitor, such that different visitors may receive different questions at the same level based on information that has already been provided. Certain questions may pertain to, or change depending upon, answers to previous questions. For example, during a request for information, a visitor may be presented with the question "How large is your business?" If the visitor responds with a business size that is larger than a threshold number, then the next question may ask about topics that would only apply to a large business. On the other hand, if the visitor's response indicated that the business is comparatively small, then the next question may ask about topics that would only apply to a small business. It will be understood that many variations are possible when segmenting the profile questions into different categories. Some embodiments allow the website to use complex rules for segmenting the order, number, and topics for each profile questionnaire. For example, it is possible to have an interface in the WCMS where rules and alternatives for each question may be selected and tailored to the individual visitor type.

In some embodiments, the profile levels/information and a lead score of a visitor may both be stored in the visitor profile of the visitor, yet these two measurements of lead progress may be independent of each other to varying degrees. However, in one embodiment, the lead score may be used to trigger the requests for visitor information required to progress through the profile levels. FIG. 3 illustrates a state diagram 300 for moving between discrete states, according to some embodiments. When a visitor 306 first encounters the website, the visitor 306 may be associated with an entry level profile state 302. As the visitor 306 interacts with the website, the lead score of the visitor 306 may increase and decrease based on the types of interactions while associated with the entry level profile state 302.

In one embodiment, every time an interaction by the visitor 306 is detected, the lead score of the visitor 306 can be adjusted in state 340. Each time the lead score of the visitor 306 is adjusted, the lead score can be compared to a threshold value. So long as the lead score of the visitor 306 stays below the threshold, no action needs to be taken, and the visitor 306 will persist in the entry level profile state 302. If at some point the lead score of the visitor 306 meets or exceeds the threshold, the website may present the visitor 306 with the opportunity to provide contact information to the website in state 350. If the visitor 306 provides the requested information, the profile level of the visitor 306 may increase to the "Identification" level 304. On the other hand, if the visitor 306 fails to provide the requested information, the profile level of the visitor 306 may revert back to the "Entry" level 302. If the user profile level reverts back to the "Entry" level 302, then the visitor 306 may be presented with a similar information request each subsequent time that a visitor 306 interaction is detected and the score increases above the threshold value. Alternatively, the lead score of the visitor 306 may be reset or reduced to the threshold of the current level, or the threshold value of the next level may be increased to allow for more navigation before the next information request is made.

Other factors may be used in addition to using the lead score of the visitor 306 as a mechanism to trigger presenting the visitor 306 with an information request. In some embodiments, a specific type of interaction by the visitor 306, such as accessing a specific section of content may trigger an information request, even if the lead score of the visitor 306 has not yet reached the threshold value. In this case, content may be "gated" such that only visitors who have achieved a certain profile level may be allowed to access the gated content. For example, in order to access a demonstration video of a product solution on the website, the visitor 506 may be required to provide enough information to have progressed past the first profile level. If the visitor 306 has already provided enough information to move to the second profile level, then the visitor 306 may be able to access the content. If instead the visitor 306 has not yet provided enough information to move beyond the first profile level, then the visitor 306 may be diverted from the demonstration video and given an opportunity to provide the requested information. If the information is provided at this time by the visitor 306, the visitor 306 may be given access to the demonstration video. On the other hand, if the visitor 306 does not provide all of the requested information, the website may deny access to the demonstration video, or it may grant some form of limited access, such as a one-time viewing of the demonstration video. Using gated content in this manner may entice the visitor 306 to provide information to the website that the visitor 306 might otherwise be reluctant to divulge.

In addition to ascending multiple levels when gated content is accessed, it may also be possible to ascend multiple profile levels when information is imported from a business account or discovered via an IP address, or through a group account. When a user profile is associated with a business/group/external account, information from the business/group/external account may be associated with the visitor profile, or the information may be imported and stored in the visitor profile. If all of the information required for a profile level is imported or available from a business/group/external account, then the profile level of the visitor may be increased without requiring the visitor to provide any additional information.

Some embodiments may also determine and/or solicit a set of interests from a visitor. "Interests" as used herein, represent the classification of visitors. For example, interests may map to different types of personas that the website is intended for. Interests could also map to different business solutions offered by the website, or to main verticals served by the operator of the website.

It may be useful to draw a distinction between the interest assignment and utilization that takes place in some embodiments described herein and the "suggested products" or banner advertisements that are often displayed on retail websites. The interests in some embodiments need not be based on physical or other characteristics of products viewed by a customer, nor need they be based on activity on websites outside of the immediate domain of the business website used by these embodiments. The interests of these embodiments can ultimately be used to identify business problems that the visitor is concerned with and to link them to business solutions provided by the organization of the website in the business-to-business market context. Unlike most advertisers that track visitors across various sites without recording identifiable information, the interests of these embodiments can instead rely heavily on identifying information provided by a visitor. The interests can also be refined based in this information gathered from visitors with each successive interaction with the website.

For example, Google's AdSense software attempts to produce advertisements based on tracking a user's web interaction over a numerous sites without recording identifying information. In contract, some embodiments of the lead management system can instead rely on personal information provided voluntarily from a visitor, and some embodiments only use that information within the single website administered by the WCMS. Additionally, embodiments of the lead management system of this invention may attempt to match business solutions offered by the website to the business associated with each visitor, while advertising software targets retail products for individual purchasers. While the website using these embodiments may include advertisements administered by third parties such as Google's AdSense, data need not be shared, the products could be very dissimilar, and the two systems could operate on completely different principles.

The number and types of interests may vary, and may be tailored to the needs of each individual business. Typically, the number of interests will be small compared to the number of categories for content on the website. In one embodiment, the website content is first divided into categories, and then visitor interests are established independently. The number of categories may correspond to individual products, departments, types of media, authors of documents, etc., and these categories may be extensive. In comparison, the website may only have a few interests corresponding to the different major problems that are addressed by the business solutions of the website.

Figure 4:
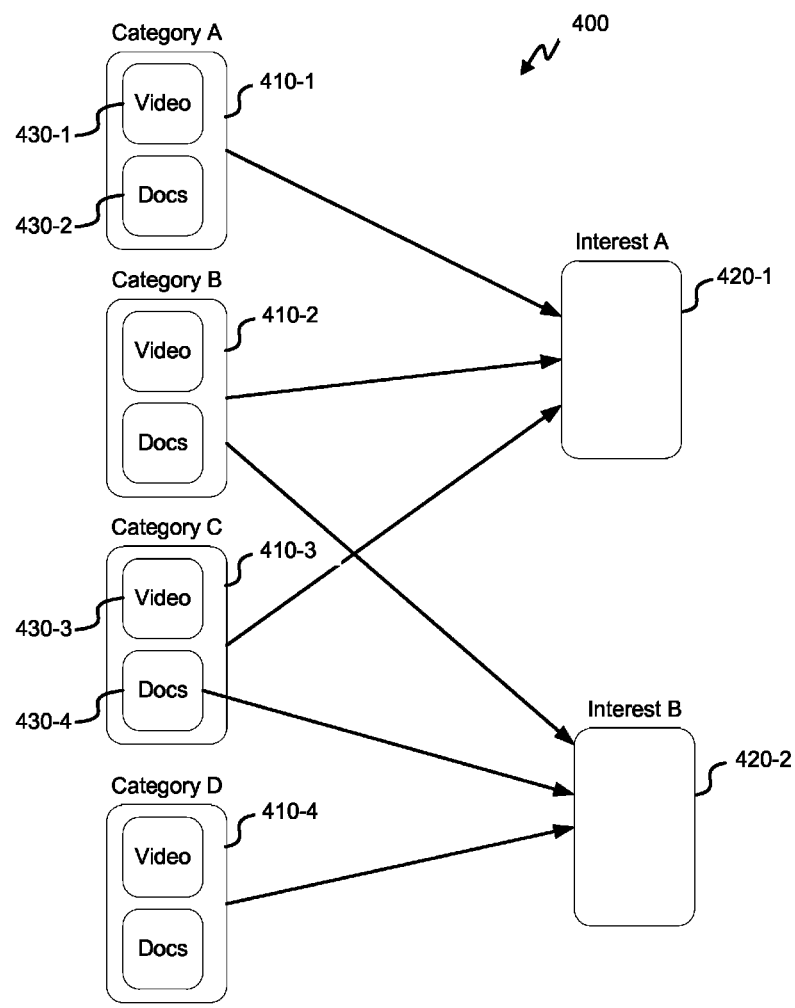
FIG. 4 illustrates a block diagram mapping interests to content, according to some embodiments.

One method for determining the interests of a visitor is to track the interactions of the visitor with the website. Content and navigation actions can be related to one or more interests, and those interests may then be related to the visitor. FIG. 4 illustrates a block diagram mapping interests to content, according to some embodiments. Each instance of content, such as a document 430-2 or a product video 430-1, can be assigned to at least one content category 410. Each content category 410 may then be associated with one or more interests 420. A content category, such as category B 410-2, may be associated with more than one interest, such as Interest A 420-1 and Interest B 420-2. For example, a series of white papers may be related to an interest named "Marketing Solutions" and related to an interest named "Management Solutions." Individual instances of content within a category may also be assigned to an interest in addition to, or in the place of, the interest assignments of the content category. For example, document 430-4 may be individually assigned to Interest B 420-2, while the rest of the content in category C 410-3 may be associated with Interest A 420-1. In another example, document 430-4 may be assigned to both Interest A 420-1 and Interest B 420-2, while the rest of the content in category C 410-3 may be only associated with Interest A 420-1.

As a visitor interacts with the website by accessing content, the interests associated with the content may be imputed to the visitor. In one embodiment, after a visitor has accessed a threshold number of content items associated with an interest, that interest may be recorded in the user profile of the visitor as an interest for the visitor. A visitor may be assigned multiple interests. Assigning an interest may depend on quantity, frequency of access, and a comparison to other interests. For example, if a visitor accesses three different documents all pertaining to a single interest, that interest may be assigned to the visitor. On the other hand, if in addition to those three documents, the visitor accessed ten documents in each of two different interests, then the latter two interests may be assigned to the visitor instead of the first interest because the visitor exhibited more interest in the latter two interests by comparison. It will be understood that interests may be dynamically assigned and unassigned to each visitor based on the continued interactions by the visitor and his/her expression of interests.

In addition to determining the interests of a visitor based on the interactions of the visitor with the website, some embodiments also determine interests both implicitly and explicitly from the user profile of the visitor. When a visitor provides certain types of information, such as business type, business role, business size, and/or various "pain points" (business problems in need of a solution), this information may lead to the assignment of one or more interests. For example, if the interests of the website are related to the business role of the visitor, such as manager, IT specialist, or marketing and sales representative, then a visitor who selects a business role that can be mapped to one of these website interests, and the interest may be assigned to the user profile of that visitor. The interests of a visitor may also be explicitly assigned by presenting the visitor with a listing of interests during a request for information when the visitor attempts to ascend to a higher profile level. A visitor who selects categories of interests may be assigned those interests. Alternatively or additionally, assignment of an interest that is explicitly chosen by a visitor may be overridden by the interactions of the visitor with the website, or vice versa. For example, if a visitor selects an interest corresponding to marketing and sales, but the interactions of the visitor exhibit only an interest in management solutions, then the marketing and sales interest may be replaced or supplemented by the management solutions interest.

Although they may be stored and analyzed separately, it should be apparent that a visitor's lead score, profile information, and interests are inter-related in how they are assigned and accumulated in this invention throughout the interaction of a visitor with a website. Additionally, the lead score, profile information, and interests can be used to tailor the experience of a visitor with the website, to guide the visitor to business solutions that are most likely to meet the business needs of the visitor, and to create a qualified lead to be passed on to the sales department of the website's organization.

As interests are assigned to a visitor and profile information is obtained, the website may provide for conditional content to tailor the experience of the visitor. As described earlier, some content may be gated, such that the visitor is required to provide information and raise their profile level before the gated content may be accessed. If the visitor fails to provide the required information, the visitor may instead be presented with alternative content based on the interests of the visitor or partial profile information that may be designed to entice the visitor to provide the required information and view the originally requested gated content. Also, content could be dynamically presented based on the lead score of the visitor. For example, content X could be displayed for visitors with a low lead score, whereas content Y may be displayed for more engaged visitors with a higher lead score. In another example, a simpler, more streamlined interface may be displayed for a new visitor with a low lead score, whereas a more complete and/or detailed interface may be used for a more engaged visitor with a higher lead score.

Featured solutions, articles, and/or marketing videos may also be dynamically displayed based on the interests and/or profile of the visitor. As the interests of a visitor are identified, the website may dynamically display content that is tagged with the interests of the visitor. For example, the visitor may have an interest named "Corporate Branding and Marketing." On the home page of the website, the business solutions and content related to "Corporate Branding and Marketing" may be prominently displayed, and additional white papers, demonstration videos, and/or more advanced materials may be added to the areas of the website dedicated to that interest. Also, a user profile may include geo-location data based either on the physical address of the visitor or on a detected IP address. For example, the website may present solutions, information, or live seminars or demonstrations that are located in the same geographic region as the visitor.

In additional to tailoring the content, the layout of the website may change according to the interests and lead score of the visitor. In some embodiments, the links on the website may be presented in a different order or prominence to emphasize the areas of the website that correlate strongest with the interests of the visitor. Additional content and hyperlinks may become available that align with the interests of a visitor as they are identified. In other embodiments, the lead score or profile level of a visitor may determine the amount of the website that is available. For example, a new visitor with a low lead score and/or a low profile level may be presented with fewer hyperlinks, whereas a more engaged visitor and/or a visitor with a higher profile level may have more hyperlinks presented in order to open up more of the website for exploration.

The tailoring of the layout of the website and the content presented to the visitor described above utilizes the profile and/or interests of the visitor. However, it is also possible to tailor the layout and content of the website for a visitor who is anonymous when he/she first interacts with the site using the IP mapping techniques also described above. A visitor who is anonymous may not have any information stored in the associated user profile when first accessing the website, but when the IP address of the visitor is detected, profile information may be used to populate the user profile of the visitor. This information may be used to tailor the content and/or layout of the website on the first visit of the visitor to the website, even though the visitor has not yet provided any information to the website. Thus, the visitor may be presented with content and layouts that are of interest to the visitor without the visitor needed to take any action other than to visit the website.

Test Visitors

The discussion above regarding lead scoring and visitor profiles can be applied equally to monitoring test visitors and test visitor profiles. As described earlier, test visitors are treated the same way by the nurturing engine as regular visitors. Therefore, the interactions of test visitors may be monitored, a lead score may be generated, they may be presented with opportunities to provide information to the nurturing engine, interests may be mapped, and website content, look and feel, and/or organization may be dynamically adjusted based on the visitor profile of the test visitor.

Figure 5:
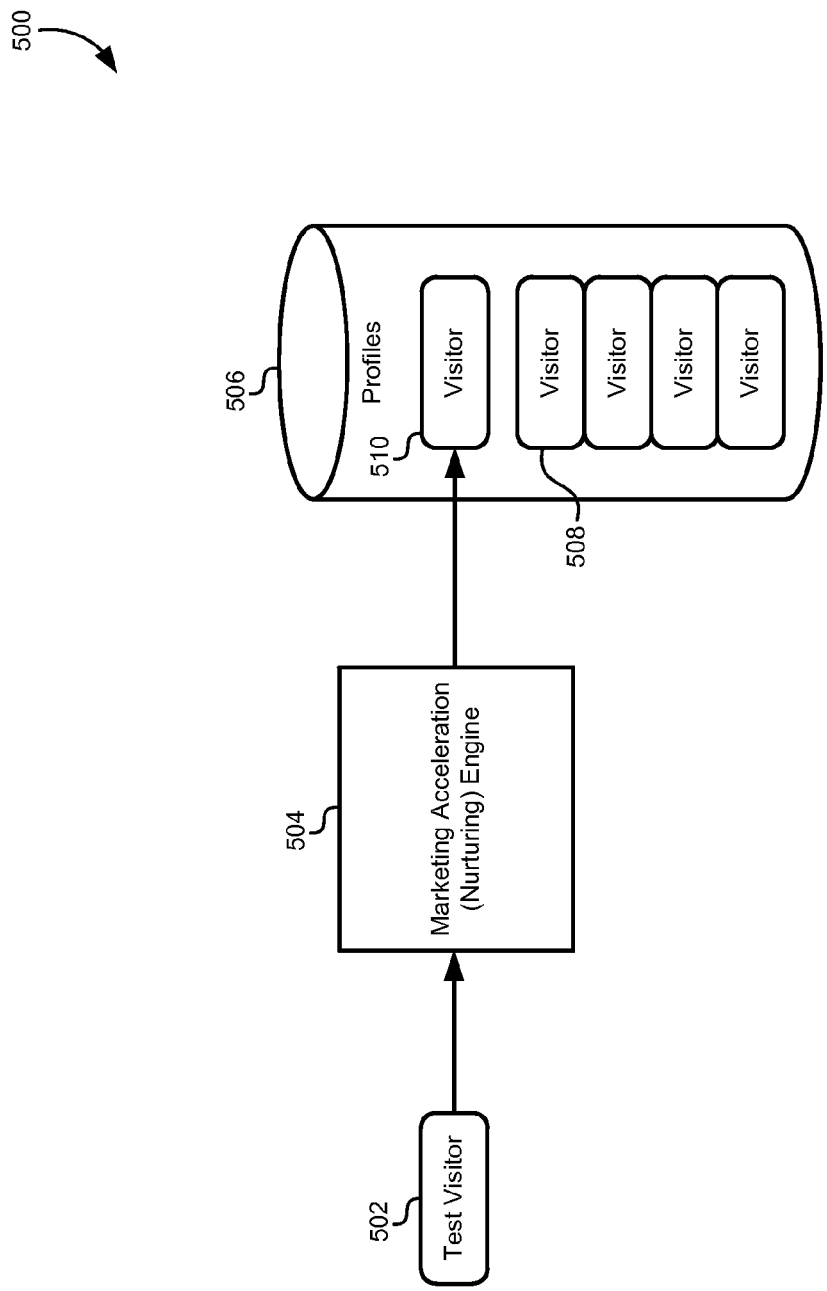
FIG. 5 illustrates a block diagram of a test visitor providing inputs to a nurturing engine, according to some embodiments.

FIG. 5 illustrates a block diagram 500 of a test visitor providing inputs to a nurturing engine, according to some embodiments. Based on the discussion above, a test visitor 502 may interact with a website by navigating through content, providing information, downloading information, and/or the like. The nurturing engine 504 may track, monitor, and store all these interactions in a visitor profile database 506. An individual visitor profile 510 may be created for the test visitor 502. The visitor profile 510 corresponding to the test visitor 502 may be stored amongst a plurality of visitor profiles 508. The plurality of visitor profiles 508 may include visitor profiles associated with both regular visitors and/or test visitors. Generally, the format and contents of a regular visitor profile may be indistinguishable from those of a test visitor profile. Thus, the visitor profile 510 associated with the test visitor 502 is treated exactly the same as a regular visitor profile by both the nurturing engine 504 and the profile database 506.

In order to compensate for the effects of test visitors, some embodiments described herein may implement methods and/or systems for identifying test visitors and distinguishing them from regular visitors. In some cases, test visitors may be detected as they are providing information to the nurturing engine while such information is being stored in the visitor profile. In other cases, test visitors may be identified at a later time by analyzing their visitor profile.

Figure 6:
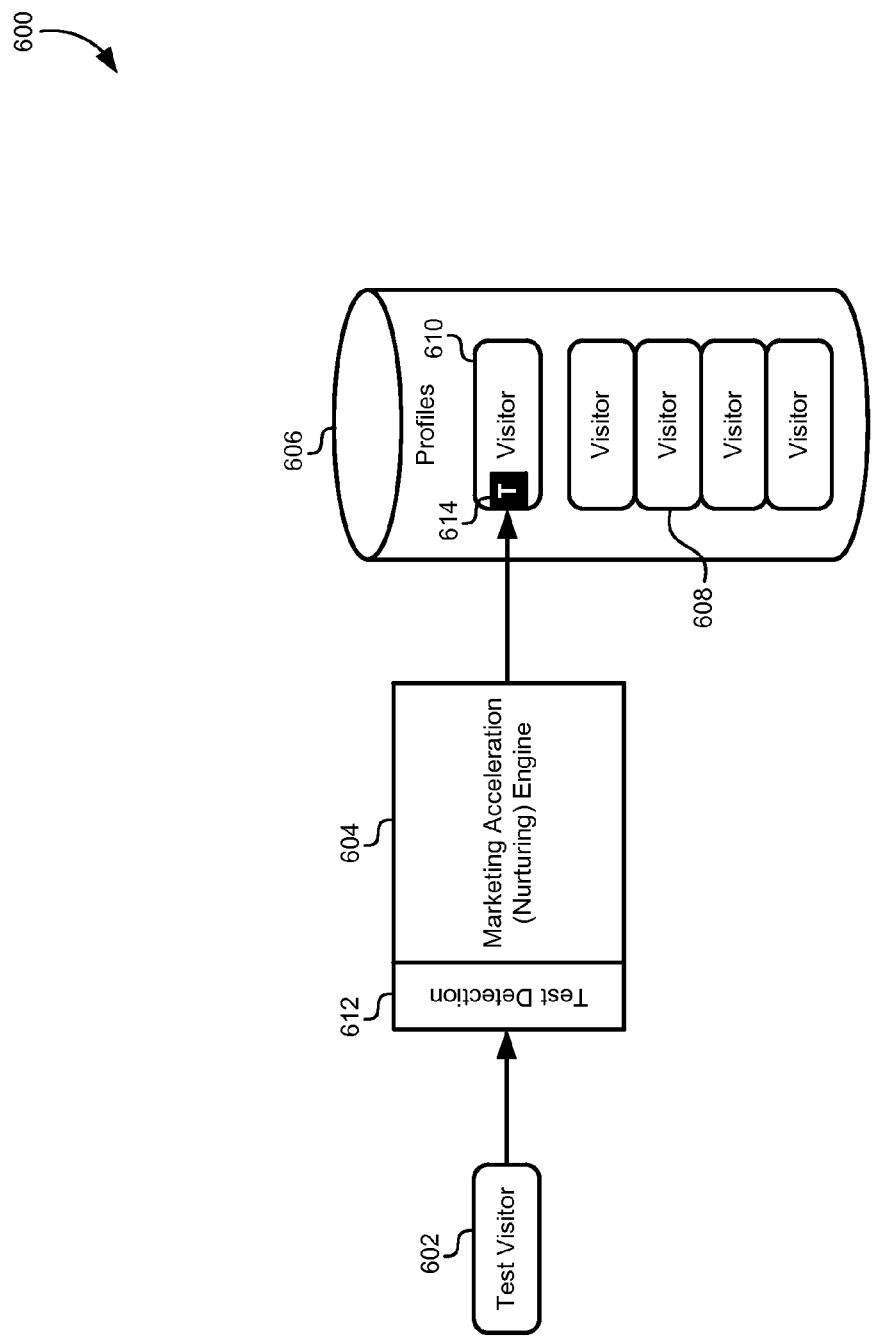
FIG. 6 illustrates a block diagram of a test visitor detection module, according to some embodiments.

FIG. 6 illustrates a block diagram 600 of a test visitor detection module, according to some embodiments. In this embodiment, a test visitor detection module 612 may be implemented as part of the nurturing engine 604. The test visitor detection module 612 may be configured to distinguish between regular visitors and a test visitor 602. This may be accomplished by monitoring the inputs provided by the test visitor 602, the interactions between the test visitor 602 and the website, information automatically obtained from external data sources, and/or information provided by the test visitor 602.

In some embodiments, the visitor test detection module 612 may monitor interactions between the test visitor 602 and the website. For example, a test visitor 602 may distinguish themselves by navigating through the website or accessing content in a particular order or fashion. Test visitors may distinguish themselves by visiting a certain webpage for a predetermined time interval, or by accessing the same content multiple times. Whatever pattern is used to identify a test visitor may be considered a code that test visitors may use to identify themselves to the test visitor detection module 612. Generally, this pattern may be configured to be one that is unlikely to be repeated by regular visitors.

In some embodiments, the visitor test detection module 612 may monitor information provided by the test visitor 602. For example, a test visitor may be directed to use a certain name, a certain address, a certain e-mail domain, a certain business name, and/or the like, when entering their personal or business contact information. For example, the test visitor 602 could identify their business as "Acme Corp." in order to identify themselves as test visitors. In another example, the test visitor 602 can use a predetermined surname such as "test" or "ACME" in order to identify themselves as a test visitor. In some cases, the visitor could truthfully identify their business or e-mail domain as belonging to the customer operating the website. For example, when testing the Acme Corp. website, a test visitor could enter their e-mail address as joe@acme.com, which would automatically be identified as a test visitor.

Some embodiments may also allow a test visitor 602 to identify themselves without explicitly entering distinguishing information. In some cases, the visitor test detection module 612 may be configured to identify a test visitor 602 based on an external data source. For example, IP address mapping services may be queried in order to identify a geographic location of the test visitor 602. The test visitor detection module 612 could determine that all IP addresses originating from a certain geographic location associated with the customer's facilities may be associated with test visitors. In other cases, the test visitor detection module 612 could also associate all IP addresses from a certain subdomain with test visitor profiles. For example, an IP address known to be associated with the customer's own computer system could be identified as a test visitor interaction.

In cases where an IP address is used to identify the test visitor 602, this determination may be made during the initial interactions between the test visitor 602 and the website. Therefore, the test visitor detection module 612 need only operate when a new visitor is detected. In other embodiments, the test visitor detection module 612 may operate continuously throughout the interactions between the test visitor 602 and the website. For example, a test visitor may initially with begin interacting with a website from a home computer, and thus would not be detected as a test visitor by virtue of their IP address. However, on a subsequent login the test visitor 602 may interact with the website from a device with an IP address associated with the customer's computer system, and thus would be identified as a test visitor at that point. Note that even if it was not initially determined that a visitor was a test visitor based on an IP address or geographic location, the test visitor detection module 612 may otherwise determine that a visitor is a test visitor by virtue of information provided, inputs, navigational patterns, and so forth.

After determining that a visitor is a test visitor, an indicator 614 may be stored in the test visitor profile 610 inside the profile database 606. Note that a test visitor profiles 610 may be identical to any of the other of the plurality of visitor profiles 608 stored in the profile database 606. In some cases, the indicator 614 may be referred to as a test visitor indicator, or a test indicator. The indicator 614 may comprise a single bit or flag, or may include other information that further identifies the circumstances under which the test visitor was identified.

In some embodiments, the indicator 614 may be alternately turned on and off as the test visitor detection module 612 determines the status of the visitor. For example, during the initial stages of the interactions between a visitor in the website, it may initially be determined that the visitor is a test visitor. However, during later interactions, it may become apparent that the visitor is a regular visitor. Therefore, the test visitor detection module 612 may continuously update the indicator 614 according to its current and best calculations regarding the state of the visitor as a test visitor.

In another embodiment (not shown) the indicator 614 need not be stored directly in the test visitor profile 610. Instead any other means of identifying the test visitor profile 610 as such may be employed. For example, the profile database 606 may store a list of pointers or references to the various test visitor profiles within the plurality of visitor profiles 608. It will be understood that the arrangement shown in FIG. 6 is merely exemplary and not meant to be limiting.

Figure 7:
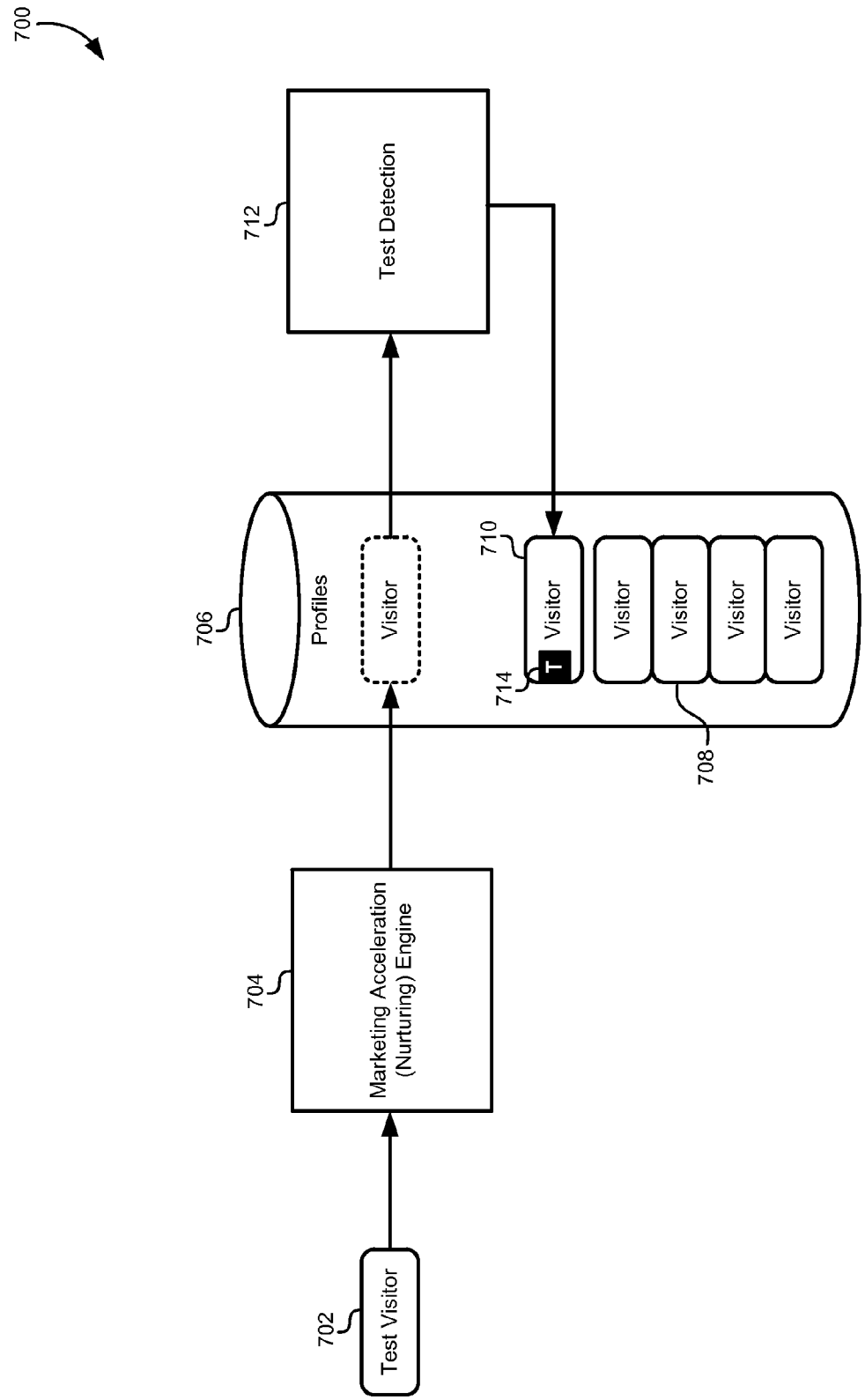
FIG. 7 illustrates a block diagram of an alternate test visitor detection module, according to some embodiments.

FIG. 7 illustrates a block diagram 700 of an alternate arrangement of a test visitor detection module 712, according to some embodiments. Compared to block diagram 600, this test visitor detection module 712 differs in that is executed using the visitor profiles stored in the profile database 706 as an input, rather than using the interactions between the visitor and the website as gathered in real time as part of the nurturing engine 704. In this embodiment, the test visitor detection module 712 may be run off-line or during times where web traffic is at a minimum. The test visitor detection module 712 may analyze all the same information as described above, the only difference being that such information may be stored in the visitor profile 710 rather than analyzed on-the-fly as it is received by the nurturing engine 704 from the test visitor 702.

In some embodiments, the test visitor detection module 712 may be run on batches of visitor profiles in the profile database 706 at regular intervals. In some cases, the test visitor detection module 712 may also use inferences made by the nurturing engine 704 regarding the interests and business affiliations associated with the test visitor profile 710. The discrete profile state in the hierarchy of states may also be used to classify the visitor is a test visitor. After identifying a test visitor profile 710, an indication may be stored 714 and the profile database 706 as described above.

FIG. 8 illustrates an interface 800 for identifying test visitors, according to some embodiments. In some embodiments, the test visitor detection module may be augmented by or replaced with a customer interface that allows a customer to directly control the test visitor status of each visitor profile. In some cases, it may simply be more efficient for a customer to search for two or three test visitors assigned to test the marketing scheme of the website. This allows the customer to deactivate or not install the test visitor detection module in order to reduce overhead and storage space.

Interface 800 is one of many possible implementations that may be used to manually select test visitors from amongst a plurality of visitor profiles. In this embodiment, a user can view a display 806 of useful visitor profile information for each visitor profile. For example, an e-mail address, a name, and/or information regarding the timing and frequency of a visitor's interactions with the website may be presented. In some cases, calculations such as a lead score or a discrete profile level may also be presented. In other embodiments, additional profile information may also be displayed that may be useful to a customer in identifying test visitors. In some embodiments (not shown) an option may be available to view the entire user profile for a selected visitor profile.

After selecting various visitor profiles as test visitor profiles, the customer may provide an input (802) instructing the interface to store an indication of the test visitor status of the selected visitor profiles in the profile database. In some embodiments, each time the interface 800 is presented, previously selected test visitor profiles will remain checked. This may also provide the customer with the option of removing the test visitor status from some visitor profiles (804).

Figure 9:
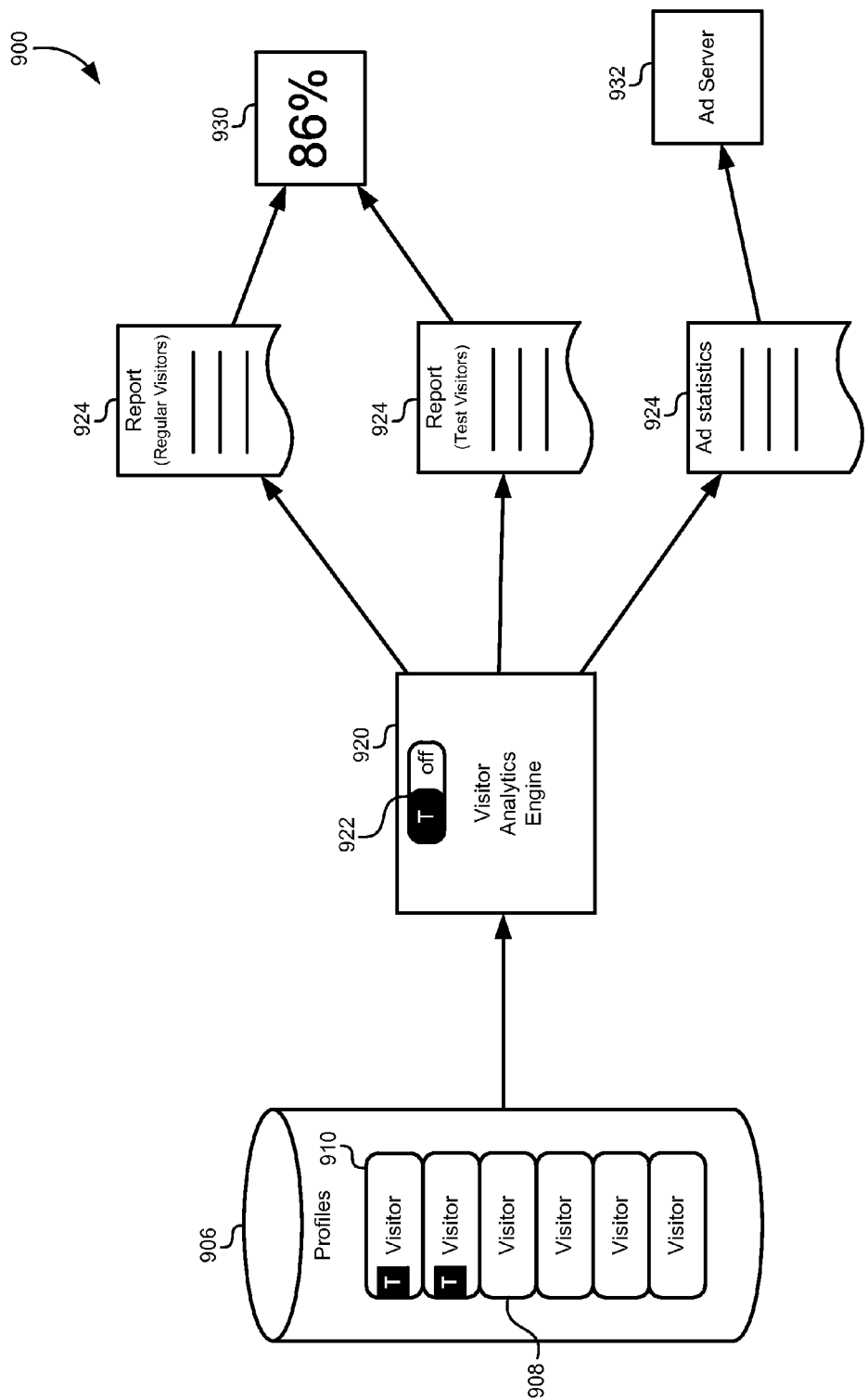
FIG. 9 illustrates a block diagram of a visitor analytics engine, according to some embodiments.

FIG. 9 illustrates a block diagram 900 of a visitor analytics engine, according to some embodiments. At this point, it may be assumed that test visitor profiles 910 within the profile database 906 have been marked as test visitor profiles, either automatically or manually as described above. The visitor analytics engine 920 may be configured to access the plurality of visitor profiles 908 in the profile database 906 in order to generate reporting data 924 that may be useful for a customer in assessing and diagnosing the effectiveness of their marketing campaign through their website.

The reporting data 924 may be controlled by input parameters provided to the visitor analytics engine 920. Merely by way of example, a customer could request reporting data that describes the number of visitor profiles that moved to a certain discrete profile level during a previous week. A customer could also request to see visitor profiles that had been stagnant for at least a month. A customer can request reporting data that diagnoses why certain visitor profiles have failed to move up in the discrete hierarchy of profile states. For example, movement from one state to the next may require downloading five different content items on the website. The reporting data may show that many customers only access three to four content items on the website before becoming stagnant. This may lead the customer to adjust their marketing strategy to reduce the number of content items needed to move up the state hierarchy. The customer could also request reporting data that generates visual depictions such as histograms, bar charts, linear graphs, and/or other statistical representations of data. These can be used to show a "velocity" at which visitors move through various profile states over time. Note that many other types of reporting data may be generated by the visitor analytics engine 920.

The visitor analytics engine 920 may include the ability to selectively consider subsets of the visitor profiles stored in the profile database based on test visitor status. In other words, a control 922 may be provided for the visitor analytics engine 920 that adjusts the input visitor profile set based on whether or not each visitor profile is classified as a test visitor profile. By controlling test visitor data on the input to the visitor analytics engine 920, complex statistical reporting data can be generated accurately. Note that complex statistical data could not be easily adjusted afterwards to compensate for test visitor data without performing copulations that meet or exceed the complexity of the original calculations required to generate reporting data in the first place. By controlling the inputs, the processing time may be reduced, and no corrective algorithms may be needed.

Various settings may be employed. In some cases, the visitor analytics engine 920 may consider only test visitor profiles. In other cases, the visitor analytics engine 920 may consider only regular visitor profiles. The visitor analytics engine 920 may also generate multiple reporting data sets 924 as depicted in FIG. 9, each having a different test visitor status. For example, two different versions of the same reporting data may be generated, one using regular visitors and the other using test visitors. This may be particularly useful in cases where test visitors represent the ideal progression of a visitor through a website's marketing plan. By comparing the test visitor reporting data to the regular visitor reporting data, it can be observed how closely actual visitors come to the ideal progression represented by test visitors. In some cases, the test visitor reporting data and the regular visitor reporting data may be compared and a score 930 may be generated that describes how closely the actual data comes to the ideal (test visitor) data. Based on the score 930, the nurturing engine may automatically adjust the state criteria, or any other parameter in order to more closely match the test visitors with the regular visitors.

Other types of reporting data 924 that may be generated by the visitor analytics engine 920 may include advertising statistics. As part of the testing process, test visitors may view pages of advertisements or even click on advertisements and navigate to a third-party website. Generally, because test visitors do not represent actual visitors to the website, these views and clicks on advertisements should be discarded in order to accurately measure and bill for the value of the advertisements. In cases where an internal ad module is used to generate advertisements, ad statistics for test visitors may be excluded from advertisement views that would normally be billed to advertising companies. In some cases, third-party ad servers 932 may monitor views and navigations through advertisements on the website. In order to maintain accurate data, the customer may provide reporting data involving test visitor ad statistics to the third-party ad server 932 such that they can adjust their billing accordingly. In one embodiment, the reporting data 924 for add statistics may be formatted such that it describes the number of clicks, views, etc. that need to be removed from the statistics of the ad server 932.

Figure 10:
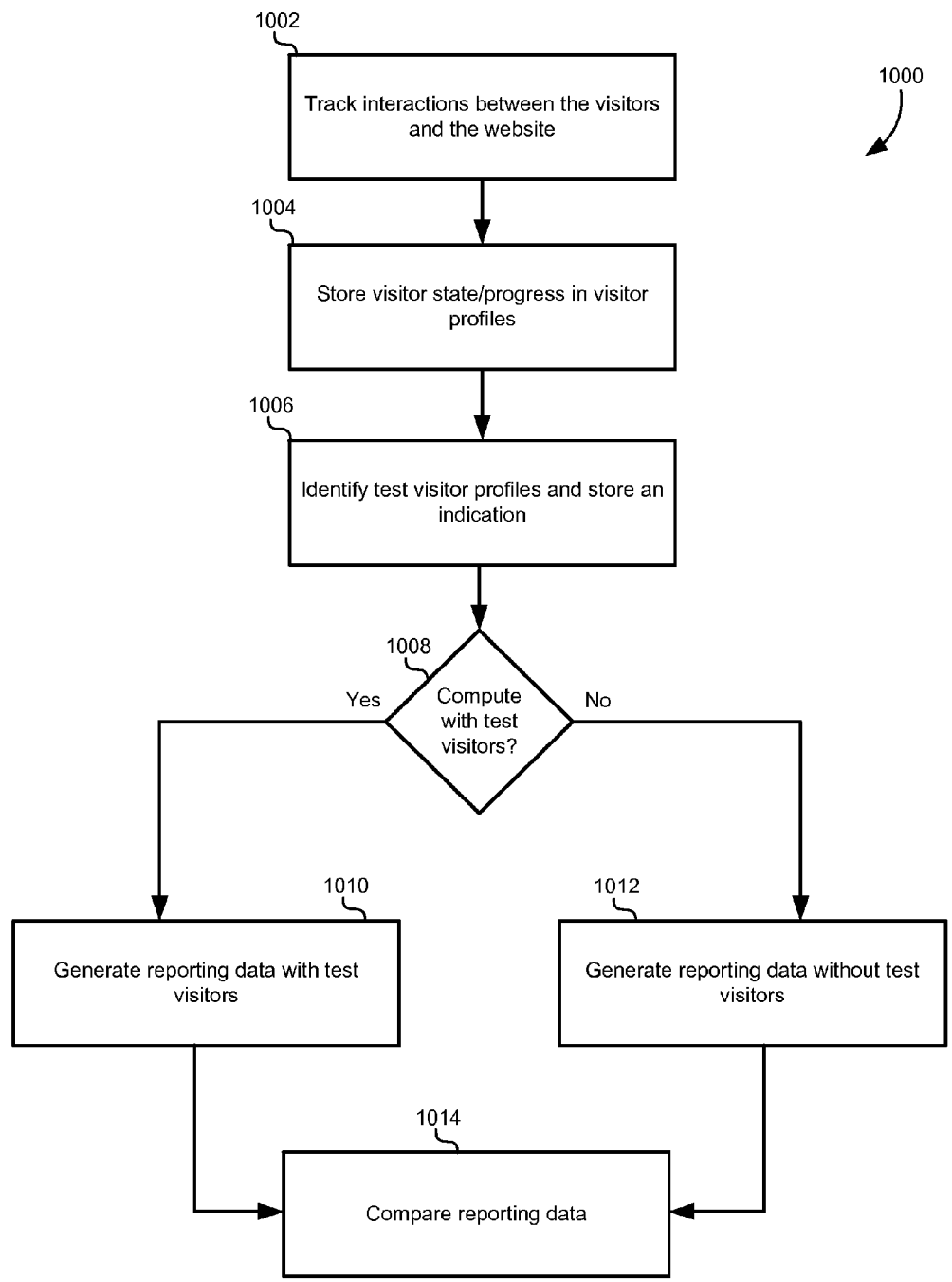
FIG. 10 illustrates a flowchart of a method for generating reporting data to compensate for test visitors, according to some embodiments.

FIG. 10 illustrates a flowchart 1000 of a method for generating reporting data that compensates for test visitors, according to some embodiments. Each operation for this method may be carried out on the computer system described above, or on a general purpose computer system without restriction. The method may include tracking interactions between visitors and the website (1002). The plurality of visitors being tracked may include one or more test visitors. Interactions may include information provided from the visitors, website navigation, content downloads, information from third parties or external databases, and inferences made by a nurturing engine.

The method may also include storing visitor state and progression in a visitor profile (1004). Visitor profile and be part of a profile database, and may include a discrete profile state from a hierarchy of profile states. The profile state may be based on a corresponding lead score, on an amount of information provided by the visitor, a number of content items viewed or downloaded, and so forth. Tracking interactions and storing the progress of the visitor may include computing a score for each visitor based on the interactions between a visitor and the website. The score may be referred to as a lead score, and may be stored in the visitor profile database.

The method may additionally include identifying test visitor profiles and storing an indication in a profile database (1006). Test visitor profiles may be identified automatically based on interactions, automatically based on IP address or other external databases, or manually by a customer employee. The identification may take place in real time as interactions and data are captured by nurturing engine. Additionally or alternatively, this identification may take place based on information stored in the visitor profiles and may take place after the interactions have been captured and analyzed.

Next, a decision may be made as to how to analyze visitor profiles (1008). In some cases, reporting data may be generated using test visitor data (1010), while in other cases, reporting data may be generated using regular visitor data (1012). Note that these two execution paths are not mutually exclusive, and reporting data may be generated that includes both test visitors and regular visitors, and multiple versions of the reporting data may be generated as described above.

In some embodiments, the reporting data may be compared internally between that based on test visitors (second reporting data) to that based on regular visitors (first reporting data). Scores may be generated and assessments may be made as to how closely regular visitors interactions track test visitor interactions. The operation of the nurturing engine may then be adjusted in response thereto.

In some embodiments, the reporting data may comprise information related to advertisement views. This ad information may be sent to both internal and external ad modules/servers to compensate for ad views recorded for test visitors.

It should be appreciated that the specific steps illustrated in FIG. 10 provide particular methods of compensating for test visitors according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Exemplary Hardware

Figure 11:
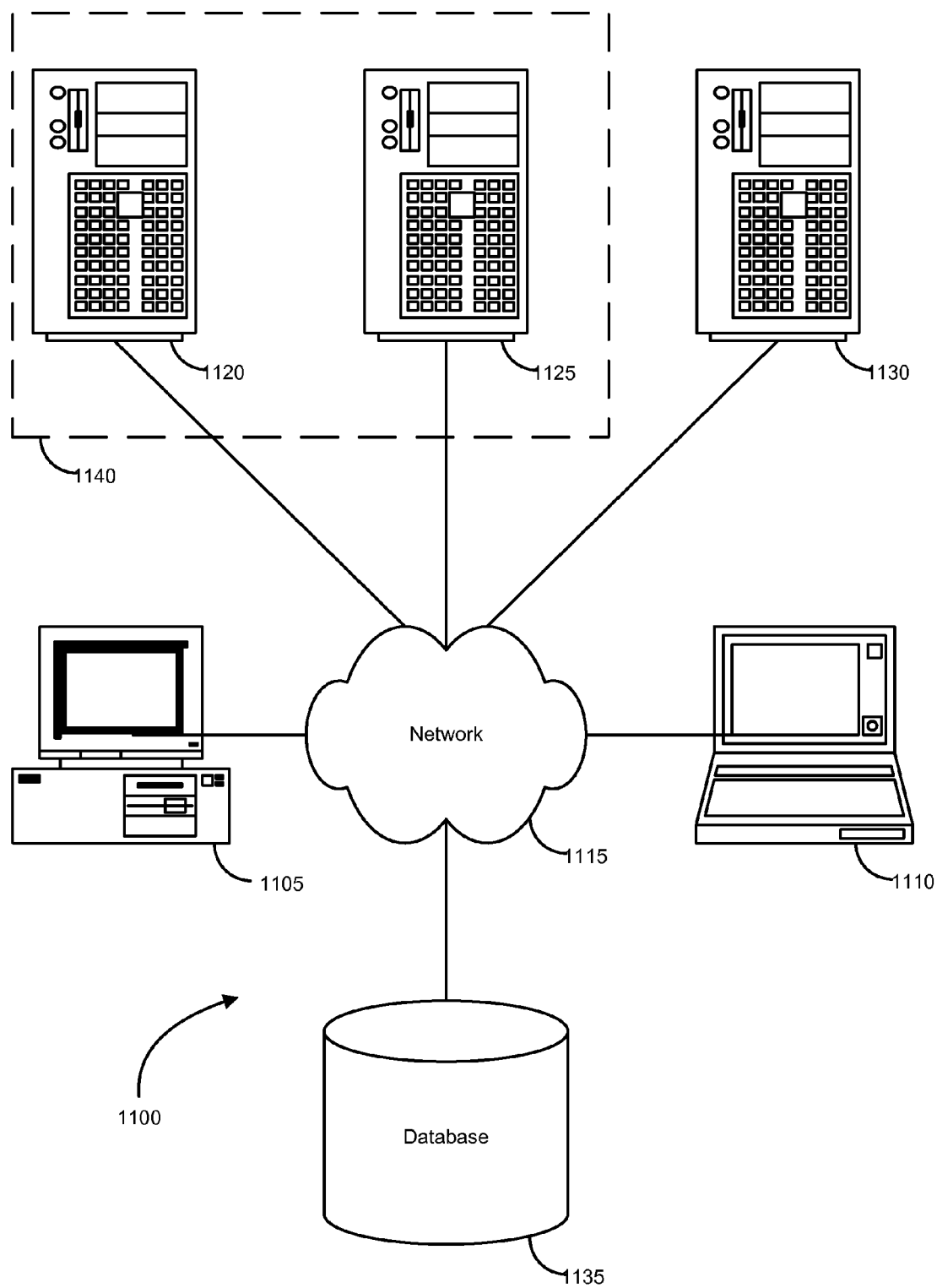
FIG. 11 illustrates an environment with which embodiments may be implemented with a computer system.

Each of the embodiments disclosed herein may be implemented in a general-purpose computer system. FIG. 11 is a block diagram illustrating components of an exemplary operating environment in which various embodiments of the present invention may be implemented. The system 1100 can include one or more user computers 1105, 1110, which may be used to operate a client, whether a dedicated application, web browser, etc. The user computers 1105, 1110 can be general purpose personal computers (including, merely by way of example, personal computers and/or laptop computers running various versions of Microsoft Corp.'s Windows and/ or Apple Corp.'s Macintosh operating systems) and/or workstation computers running any of a variety of commercially-available UNIX or UNIX-like operating systems (including without limitation, the variety of GNU/Linux operating systems). These user computers 1105, 1110 may also have any of a variety of applications, including one or more development systems, database client and/or server applications, and web browser applications. Alternatively, the user computers 1105, 1110 may be any other electronic device, such as a thin-client computer, Internet-enabled mobile telephone, and/or personal digital assistant, capable of communicating via a network (e.g., the network 1115 described below) and/or displaying and navigating web pages or other types of electronic documents. Although the exemplary system 1100 is shown with two user computers, any number of user computers may be supported.

In some embodiments, the system 1100 may also include a network 1115. The network can be any type of network familiar to those skilled in the art that can support data communications using any of a variety of commercially-available protocols, including without limitation TCP/IP, SNA, IPX, AppleTalk, and the like. Merely by way of example, the network 1115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 1120, 1125, 1130 which can be general purpose computers and/or specialized server computers (including, merely by way of example, PC servers, UNIX servers, mid-range servers, mainframe computers rack-mounted servers, etc.). One or more of the servers (e.g., 1130) may be dedicated to running applications, such as a business application, a web server, application server, etc. Such servers may be used to process requests from user computers 1105, 1110. The applications can also include any number of applications for controlling access to resources of the servers 1120, 1125, 1130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1105, 1110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1105, 1110.

In some embodiments, an application server may create web pages dynamically for displaying on an end-user (client) system. The web pages created by the web application server may be forwarded to a user computer 1105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 1100 may also include one or more databases 1135. The database(s) 1135 may reside in a variety of locations. By way of example, a database 1135 may reside on a storage medium local to (and/or resident in) one or more of the computers 1105, 1110, 1115, 1125, 1130. Alternatively, it may be remote from any or all of the computers 1105, 1110, 1115, 1125, 1130, and/or in communication (e.g., via the network 1120) with one or more of these. In a particular set of embodiments, the database 1135 may reside in a storage-area network ("SAN") familiar to those skilled in the art. Similarly, any necessary files for performing the functions attributed to the computers 1105, 1110, 1115, 1125, 1130 may be stored locally on the respective computer and/or remotely, as appropriate. In one set of embodiments, the database 1135 may be a relational database, such as Oracle 10g, that is adapted to store, update, and retrieve data in response to SQL-formatted commands.

Figure 12:
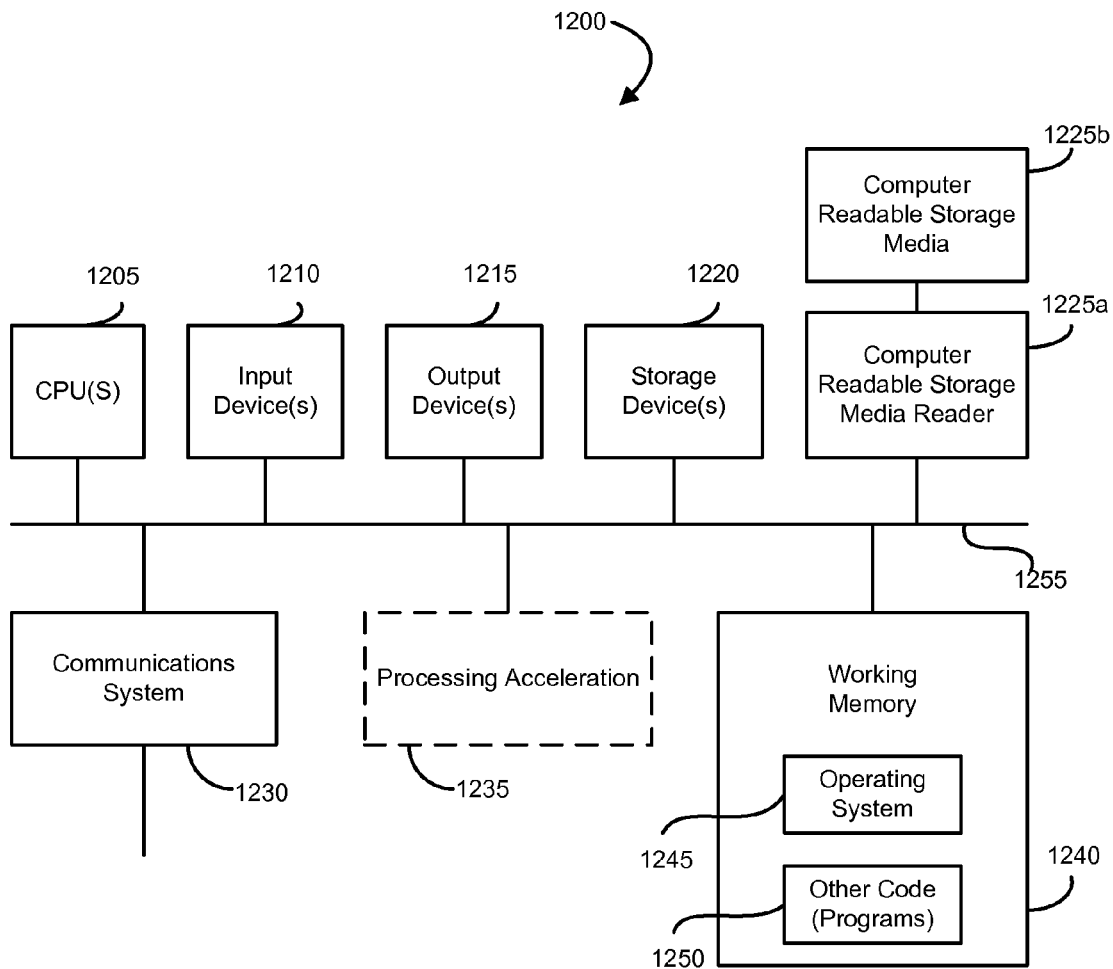
FIG. 12 illustrates an embodiment of a special-purpose computer system.

FIG. 12 illustrates an exemplary computer system 1200, in which various embodiments of the present invention may be implemented. The system 1200 may be used to implement any of the computer systems described above. The computer system 1200 is shown comprising hardware elements that may be electrically coupled via a bus 1255. The hardware elements may include one or more central processing units (CPUs) 1205, one or more input devices 1210 (e.g., a mouse, a keyboard, etc.), and one or more output devices 1215 (e.g., a display device, a printer, etc.). The computer system 1200 may also include one or more storage device 1220. By way of example, storage device(s) 1220 may be disk drives, optical storage devices, solid-state storage device such as a random access memory ("RAM") and/or a read-only memory ("ROM"), which can be programmable, flash-updateable and/or the like.

The computer system 1200 may additionally include a computer-readable storage media reader 1225*a*, a communications system 1230 (e.g., a modem, a network card (wireless or wired), an infra-red communication device, etc.), and working memory 1240, which may include RAM and ROM devices as described above. In some embodiments, the computer system 1200 may also include a processing acceleration unit 1235, which can include a DSP, a special-purpose processor and/or the like.

The computer-readable storage media reader 1225*a* can further be connected to a computer-readable storage medium 1225*b*, together (and, optionally, in combination with storage device(s) 1220) comprehensively representing remote, local, fixed, and/or removable storage devices plus storage media for temporarily and/or more permanently containing computer-readable information. The communications system 1230 may permit data to be exchanged with the network 1220 and/or any other computer described above with respect to the system 1200.

The computer system 1200 may also comprise software elements, shown as being currently located within a working memory 1240, including an operating system 1245 and/or other code 1250, such as an application program (which may be a client application, web browser, mid-tier application, RDBMS, etc.). It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed. Software of computer system 1200 may include code 1250 for implementing embodiments of the present invention as described herein.

Each of the methods described herein may be implemented by a computer system, such as computer system 1200 in FIG. 12. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium or memory to form a tangible product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A system for analyzing website nurturing data while compensating for test visitor profiles, the system comprising:
a nurturing engine that receives interactions between a plurality of visitors and a website, wherein:
the plurality of visitors comprises one or more test visitors; and
the nurturing engine scores each of the plurality of visitors based on the interactions between each of the plurality of visitors and the website;
a profile database that stores a plurality of visitor profiles that correspond to the plurality of visitors, wherein:
each of the plurality of visitor profiles is assigned a discrete profile state from a hierarchy of profile states; and
the plurality of visitor profiles comprises one or more test visitor profiles corresponding to the one or more test visitors; and
each of the one or more test visitor profiles includes a test indicator; and
a visitor analytics engine that is configured to:
receive the plurality of visitor profiles; and
generate reporting data based on the plurality of visitor profiles, wherein the one or more test visitor profiles are excluded at least in part from the reporting data.

2. The system of claim 1 wherein the reporting data describes a progression of the plurality of visitor profiles through the hierarchy of profile states.

3. The system of claim 1 wherein the one or more test visitors comprises inputs provided from a customer employee to the website to test a progression through the hierarchy of profile states.

4. The system of claim 1 wherein the nurturing engine is configured to customize a website feature comprising one or more selections from the group consisting of: website content, website look-and-feel, and website organization.

5. The system of claim 1 further comprising a visitor identification module that is configured to:
automatically identify the one or more test visitor profiles from among the plurality of visitor profiles; and
store the test visitor indicator in each of the one or more test visitor profiles based on the automatic identification.

6. The system of claim 1 further comprising a visitor identification module that is configured to:
receive one or more user inputs that identify the one or more test visitor profiles from among the plurality of visitor profiles; and
store the test visitor indicator in each of the one or more test visitor profiles based on the one or more user inputs.

7. The system of claim 1 wherein:
the reporting data comprises first reporting data; and
the visitor analytics engine is further configured to generate second reporting data based on the plurality of visitor profiles, wherein the one or more test visitor profiles are used to generate the reporting data.

8. The system of claim 7 wherein the visitor analytics engine is further configured to compare the first reporting data to the second reporting data to generate a score indicating an effectiveness of the nurturing engine.

9. The system of claim 8 wherein parameters of the nurturing engine are altered based on the score.

10. The system of claim 1, wherein the nurturing engine provides access to gated content for a device associated with a first visitor profile in the plurality of profiles based on the discrete profile state assigned to the first visitor profile from the hierarchy of profile states.

11. A method of analyzing website nurturing data while compensating for test visitor profiles, the method comprising:
tracking interactions between a plurality of visitors and a website, wherein the plurality of visitors comprises one or more test visitors;
computing a score for each of the plurality of visitors based on the interactions between each of the plurality of visitors and the website;
storing the score for each of the plurality of visitors in a plurality of visitor profiles, wherein the plurality of visitor profiles comprises one or more test visitor profiles corresponding to the one or more test visitors;

assigning a discrete profile state to each of the plurality of visitor profiles from a hierarchy of profile states based at least in part on the corresponding score;

storing a test indicator in each of the one or more test visitor profiles; and computing reporting data based on the plurality of visitor profiles, wherein the one or more test visitor profiles are excluded at least in part from the reporting data.

12. The method of claim 11, wherein the reporting data describes a progression of the plurality of visitor profiles through the hierarchy of profile states.

13. The method of claim 11, wherein the one or more test visitors comprises inputs provided from a customer employee to the website to test a progression through the hierarchy of profile states.

14. The method of claim 11, wherein a website feature comprising one or more selections from the group consisting of: website content, website look-and-feel, and website organization; is customized based on the interactions between each of the plurality of visitors and the website.

15. The method of claim 11, further comprising:
automatically identifying the one or more test visitor profiles from among the plurality of visitor profiles; and
storing the test visitor indicator in each of the one or more test visitor profiles based on the automatic identification.

16. The method of claim 11, further comprising:
receiving one or more user inputs that identify the one or more test visitor profiles from among the plurality of visitor profiles; and
storing the test visitor indicator in each of the one or more test visitor profiles based on the one or more user inputs.

17. The method of claim 11, wherein:
the reporting data comprises first reporting data; and
the method further comprises generating second reporting data based on the plurality of visitor profiles, wherein the one or more test visitor profiles are used to generate the reporting data.

18. The method of claim 17, further comprising comparing the first reporting data to the second reporting data to generate a score indicating an effectiveness of the nurturing engine.

19. The method of claim 18, further comprising altering parameters of the nurturing engine based on the score.

20. The method of claim 11, further comprising providing access to gated content for a device associated with a first visitor profile in the plurality of profiles based on the discrete profile state assigned to the first visitor profile from the hierarchy of profile states.

* * * * *